United States Patent
Henn

(10) Patent No.: US 11,491,601 B2
(45) Date of Patent: Nov. 8, 2022

(54) MULTI-JOINING SYSTEM

(71) Applicant: Guido Anton Henn, Bad Muenstereifel (DE)

(72) Inventor: Guido Anton Henn, Bad Muenstereifel (DE)

(73) Assignee: Nomis LLC, Palatine, IL (US)

( * ) Notice: Subject to any disclaimer, the term of this patent is extended or adjusted under 35 U.S.C. 154(b) by 864 days.

(21) Appl. No.: 15/881,206

(22) Filed: Jan. 26, 2018

(65) Prior Publication Data
US 2019/0232452 A1 Aug. 1, 2019

(51) Int. Cl.
*B23Q 35/46* (2006.01)
*B23Q 35/44* (2006.01)
*B27C 5/10* (2006.01)
*B27F 1/08* (2006.01)

(52) U.S. Cl.
CPC ............ *B23Q 35/46* (2013.01); *B23Q 35/44* (2013.01); *B27C 5/10* (2013.01); *B23Q 2703/02* (2013.01); *B27F 1/08* (2013.01)

(58) Field of Classification Search
CPC .... B27F 1/12; B27F 5/00; B27F 5/002; B27F 5/12; B27C 5/10; B27C 5/06; B25B 5/02; B25B 5/14; B25B 5/003; B25B 5/142; B25B 11/00; B23B 47/287; B23B 47/2247; B23Q 9/35
USPC .......... 269/291, 109, 110, 111, 112, 113, 41, 269/228
See application file for complete search history.

(56) References Cited

U.S. PATENT DOCUMENTS

| | | | |
|---|---|---|---|
| 3,109,466 A | * 11/1963 | Jones | B27F 1/12 144/144.1 |
| 3,159,394 A | * 12/1964 | Burns | E04G 21/18 269/74 |
| 3,764,126 A | * 10/1973 | Arenas | B23Q 3/10 269/60 |

(Continued)

OTHER PUBLICATIONS

Gibson, Kerry, "Router Boss Multi-Purpose Routing Jig", Sep. 2009, The Craftsman Gallery, PO Box 54101, Cincinnati, Ohio 45254 USA (Year: 2009).*

(Continued)

*Primary Examiner* — Adam J Eiseman
*Assistant Examiner* — Fred C Hammers
(74) *Attorney, Agent, or Firm* — Reinhart Boerner Van Deuren P.C.

(57) ABSTRACT

A template holding jig for holding a template for use with a router for routing a workpiece is provided. The holding jig may also be part of a workpiece joining jig that includes a plurality of templates. The template holding jig includes a template support, a workpiece support and a template guide. The template support defines a template support plane. The workpiece support defines a workpiece support plane extending perpendicular to the template support plane. The template guide defines at least one abutment preventing motion of a template located on the template support parallel to a first axis being parallel to the workpiece support plane and parallel to the template support plane. The at least one abutment permits motion of the template parallel to a second axis being orthogonal to the workpiece support plane and perpendicular to the first axis and parallel to the template support plane.

35 Claims, 27 Drawing Sheets

(56) References Cited

U.S. PATENT DOCUMENTS

| | | | | |
|---|---|---|---|---|
| 4,137,003 | A * | 1/1979 | Budoff | B23B 47/287 144/69 |
| 4,373,562 | A * | 2/1983 | Vernon | B27F 1/12 144/144.1 |
| 4,479,523 | A * | 10/1984 | Peterson | B27F 1/12 144/144.51 |
| 4,607,673 | A * | 8/1986 | McCord, Jr. | B27F 1/12 144/144.51 |
| 4,809,755 | A * | 3/1989 | Pontikas | B27F 1/12 144/144.51 |
| 4,995,435 | A * | 2/1991 | Godfrey | B27F 1/02 144/144.1 |
| 5,285,832 | A * | 2/1994 | Gibson | B27F 1/12 144/144.51 |
| 5,421,384 | A * | 6/1995 | Nuwordu | B23Q 3/16 144/144.51 |
| 5,492,160 | A * | 2/1996 | McCracken | B23Q 9/0085 144/144.51 |
| 6,954,979 | B2 * | 10/2005 | Logan | A47G 1/105 227/110 |
| 8,016,005 | B1 * | 9/2011 | Weinstein | B27F 5/02 144/144.51 |
| 8,156,973 | B2 * | 4/2012 | Stepp | B27F 1/12 144/145.1 |
| 2004/0256028 | A1 * | 12/2004 | Gregoire | B27B 25/10 144/3.1 |
| 2010/0000631 | A1 * | 1/2010 | Van Valkenburg | B27C 5/06 144/144.1 |
| 2014/0064868 | A1 * | 3/2014 | Clark | B25H 3/003 408/241 B |

OTHER PUBLICATIONS

Mann, Guido Anton, "Router Manual, Choose, Operate, Master", Sep. 2010, Vincentz Network GmbH & Co, Plannerstrasse 4c 30175 Hannover (Year: 2010).*

Stepp, Lewis, "Router Boss Multi-Purpose Routing Jig", Feb. 19, 2008, The Craftsman Gallery (www.chipsfly.com), PO Box 54101, Cincinnati, Ohio 45254 USA (site accessed Jan. 22, 2021) (Year: 2008).*

Woodworker's Journal (www.woodworkersjournal.com/box-joint-jig-reviews), Five Box Joint Jig Reviews, Jan. 19, 2018 (site accessed Jan. 14, 2021) (Year: 2018).*

Guido Henn; Workshop Training for Woodwork, Router Manual, Choose, Operate, Master; Book; published Apr. 2011; Vincentz, www.HolzWerken.net; 26 pages.

* cited by examiner

MULTI-JOINING SYSTEM

FIELD OF THE INVENTION

This invention generally relates to jigs for use with routers and particularly jigs for supporting templates and workpieces.

BACKGROUND OF THE INVENTION

Routers are often used by woodworkers to form recesses, pockets or connectors in workpieces to connect the workpieces together. To provide accurate and precise connection of the multiple workpieces, it is important to accurately guide the motion of the router as it routes the workpieces to form the recesses or pockets that receive connectors or to directly form the connectors in the workpieces themselves.

Currently a large number of connections are available to connect workpieces including, but not limited to: dovetails, box joints, mortise and tenon, dowels, biscuits, dominos, butterfly, etc. Unfortunately, each of these connections typically use individual structures to help form the appropriate structures in the workpieces to allow for the various connections to be made. This can be very expensive as well as take up a significant amount of space within a woodworker's workshop.

The present invention provides improvements over the current state of the art.

BRIEF SUMMARY OF THE INVENTION

The present invention provides a new and improved template holding jig as well as a new and improved workpiece joining jig. The template holding jig can properly orient a workpiece relative to a template. The template is removable from the template holding jig so that a different template may be used for a different type of guided motion of a router.

In an embodiment, a template holding jig for holding a template for use with a router for routing a workpiece is provided. The template holding jig includes a template support, a workpiece support and a template guide. The template support defines a template support plane. The workpiece support defines a workpiece support plane extending perpendicular to the template support plane. The template guide defines at least one abutment preventing motion of a template located on the template support parallel to a first axis being parallel to the workpiece support plane and parallel to the template support plane. The at least one abutment permits motion of the template parallel to a second axis being orthogonal to the workpiece support plane and perpendicular to the first axis and parallel to the template support plane.

In one embodiment, the at least one abutment of the template guide is provided by first and second walls that are parallel to one another and spaced apart from one another parallel to the first axis. The first and second walls are offset from the template support plane parallel to a third axis that is parallel to the workpiece support plane and perpendicular to the first and second axes.

In one embodiment, the first and second walls are positioned at opposite first and second ends of the template support with the template support being positioned between the first and second walls. This provides channel therebetween in which a template may be positioned.

In one embodiment, the template holding jig includes a template attachment for affixing a template to the template support. The template attachment has a first configuration securing the template to the template support such that the template is affixed to and cannot be moved relative to the template support and a second configuration that allows the template to be moved relative to the template support parallel to the second axis.

In one embodiment, the template attachment is a bolt extending parallel to a third axis being orthogonal to the template support plane and a releasable nut. The nut and template support sandwiching the template therebetween when the template attachment is in the first configuration and a template is mounted thereto.

In one embodiment, a portion of the template support that defines the template support plane is an exterior surface of the template support. A portion of the workpiece support that defines the workpiece support plane is an exterior surface of the work piece support. The exterior surface of the template support does not extend beyond the exterior surface of the workpiece support. The template support plane and the workpiece support plane have an exterior angle of 270 degrees therebetween. This forms an L-shape configuration with the exterior surfaces being on the outsides of the L-shape (e.g. left side and bottom side of the L-shape).

In one embodiment, first and second workpiece side stops are mounted adjacent the workpiece support. The first and second workpiece side stops are adjustably positionable parallel to the first axis relative to the workpiece support to adjust spacing between the first and second workpiece side stops to accommodate different sized workpieces. The side stops position a workpiece relative to the template support along the workpieces support plane parallel to the first axis.

In one embodiment, first and second workpiece side stop mounts selectively fix the position of the first and second workpiece side stops relative to the workpiece support. The mounts may be releasable to allow for adjusting the position of the first and second workpiece side stops.

In one embodiment, a clamp attaches to the first workpiece side stop. The clamp is movable with the first workpiece side stop relative to the workpiece support. The clamp is actuatable to provide a force orthogonal to the workpiece support plane to a workpiece being supported by the workpiece support positioned adjacent the first workpiece side stop.

In one embodiment, a miter fence defines first and second miter abutments defining first and second miter abutment planes. The first miter abutment plane extends orthogonally relative to the workpiece support plane and at a 45 degree angle to the template support plane. The second miter abutment plane extends orthogonal to the first miter abutment plane and orthogonally relative to the workpiece support plane and at a 45 degree angle to the template support plane. The miter fence being fixably attachable adjacent to the workpiece support.

In one embodiment, a position of the template support is adjustably fixable relative to the miter fence parallel to a third axis being parallel to the workpiece support plane and perpendicular to the first and second axes and orthogonal to the template support plane.

In one embodiment, first and second workpiece support guides are attached to the miter fence. The first and second workpiece support guides being spaced a part parallel to the first axis forming a gap therebetween. The workpiece support being positioned between and in abutment with the first and second workpiece support guides.

In one embodiment, the first and second workpiece support guides and miter fence form a support base that is releasably attachable to the workpiece support and template support. The support base may be clamped to a workbench to support the workpiece support and template support relative to the workbench.

In one embodiment, first and second clamps attach to the miter fence. The first clamp is actuatable to provide a force orthogonal to the workpiece support plane between the template support plane and the first miter abutment plane. The second clamp is actuatable to provide a force orthogonal to the workpiece support plane between the template support plane and the second miter abutment plane.

In one embodiment, the at least one abutment of the template guide is provided by first and second walls that are parallel to one another and spaced apart from one another along the first axis. The first and second miter abutment planes intersect at an intersection that is centered between the first and second walls along the first axis.

In one embodiment, the template holding jig includes a void formed by the template support and the workpiece support proximate the intersection of the template support plane and the workpiece support plane.

In one embodiment, a sacrificial support piece is located within the void.

In one embodiment, one side of the sacrificial support piece forms part of the workpiece support plane and supports a workpiece when mounted to the workpiece support plane. In a more particular embodiment, a second side of the sacrificial support piece forms part of the template support plane and supports a template when mounted thereto.

In one embodiment, the sacrificial support piece is replaceable.

In one embodiment, a sacrificial support piece is releasably mounted to the workpiece support against the workpiece support plane. The sacrificial support defines a second workpiece support plane offset from and parallel to the workpiece support plane defined by the workpiece support.

In one embodiment, a clamp for securing the workpiece against the second workpiece support plane defined by the sacrificial support piece is provided.

In another embodiment, a workpiece joining jig for use with a router for joining workpieces is provided. The workpiece joining jig includes a template holding jig as outlined above and a first template. The first template is removably mountable to the template support in abutment with the template guide. The first template is fixed to the template guide and template support when the first template is mounted to the template support and the template attachment is in the first configuration. The template guide could be provided the template attachment. The template guide properly aligns a mounted template for precision operation.

In one embodiment, the first template is movable relative to the template guide and template support when the first template is mounted to the template support and the template attachment is in the second configuration.

In one embodiment, the first template has a first router guide region configured to guide motion of a router relative to the first template in a first predetermined manner such that the router may engage a workpiece mounted to a workpiece support. The system further includes a second template removably mountable to the template support in abutment with the template guide. When used, the second template is fixed to the template guide and template support when the second template is mounted to the template support and the template attachment is in the first configuration. The second template has a second router guide region configured to guide motion of a router relative to the second template in a second predetermined manner such that the router may engage a workpiece mounted to the workpiece support. The second predetermined manner is different than the first predetermined manner such that the router will engage a workpiece in a different manner than when using the first template.

In one embodiment, the first router guide region is at least one circular hole extending through a first body of the of the first template permitting axial motion of the router parallel to a central axis of the hole through the first body. The central axis of the hole is perpendicular to the first and second axes and the template support plane and parallel to the workpiece support plane. The at least one hole prevents motion of the router parallel to the template support plane when engaged with the router. Typically, the hole is sized to the outer diameter of a guide bushing of a router. This prevents slop therebetween. The second router guide region is an elongated slot formed in and extending through a second body of the second template. The elongated slot permits axial motion of the router parallel to the second axis and parallel to the template support plane and orthogonal to the workpiece support plane. The elongated slot prevents motion of the router parallel to the first axis when engaged with the router. Typically, the elongated slot would engage the guide bushing. The elongated slot may be U-shaped and be open ended in some forms.

In one embodiment, the at least one abutment of the template guide is provided by first and second walls that are parallel to one another and spaced apart from one another parallel to the first axis. The first and second walls are offset from the template support plane parallel to a third axis being parallel to the workpiece support plane and perpendicular to the first and second axes and the template support. The first template includes first and second spaced apart abutments configured to abut the first and second walls to prevent movement of the first template parallel to the first axis when the first template is mounted to the template support. The spaced apart walls may be sides of the template when a rectangular template body is used. The first and second abutments permit movement of the first template parallel to the second axis when the template attachment is in the second configuration. The second template includes third and fourth spaced apart abutments configured to abut the first and second walls to prevent movement of the second template parallel to the first axis when the second template is mounted to the template support. The spaced apart walls may be sides of the template when a rectangular template body is used. The third and fourth abutments permit movement of the second template parallel to the second axis when the template attachment is in the second configuration.

In one embodiment, the at least one abutment of the template guide is provided by first and second walls that are parallel to one another and spaced apart from one another parallel to the first axis, the first and second walls being offset from the template support plane parallel to a third axis being parallel to the workpiece support plane and perpendicular to the first and second axes. The first template includes first and second spaced apart abutments configured to abut the first and second walls to prevent movement of the first template parallel to the first axis when the first template is mounted to the template support. The first and second abutments permit movement of the first template parallel to the second axis when the template attachment is in the second configuration;

In one embodiment, the first and second walls face each other along the first axis and the first and second spaced apart abutments face away from one another along the first axis.

In one embodiment, the workpiece joining jig includes a miter fence as outlined above. The miter fence maybe releasably attachable adjacent to the workpiece support.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
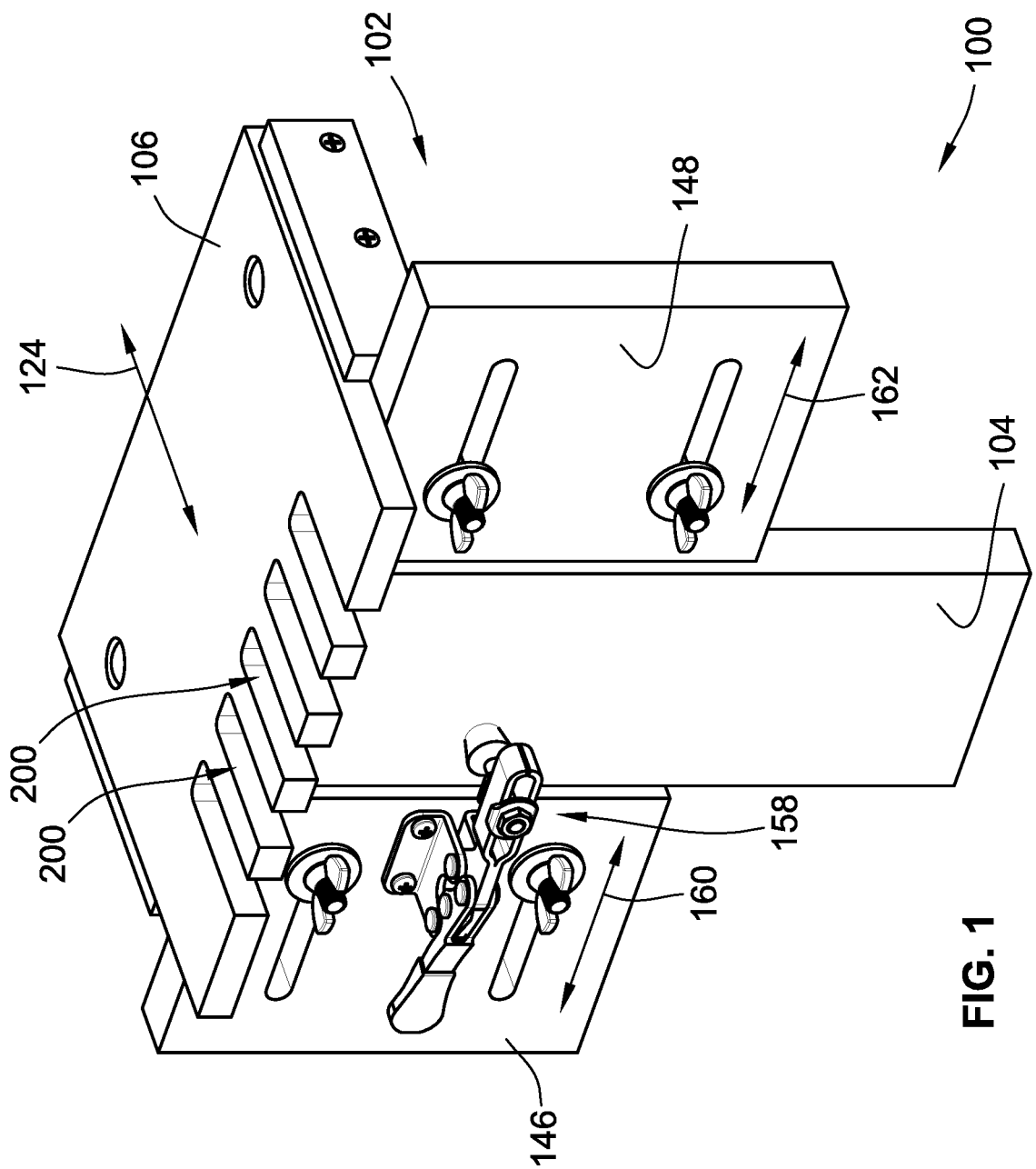
FIG. 1 is a perspective illustration of a first configuration of a workpiece joining jig.

FIG. 1 illustrates a workpiece joining jig 100 (also referred to as a router jig or a multi-joining system) in a first configuration. The workpiece joining jig 100 is used with a router (not shown) to route or otherwise cut a plurality of workpieces for subsequent joining of the workpieces. Using the workpiece joining jig 100 in this or alternative configurations that will be described below, workpieces may be connected with connections formed directly into the workpiece with the router such as using a dovetail or mortise and tenon connection. Additionally, workpieces could be connected using connectors that extend into recesses or cavities formed in one each of the workpieces using the router and the workpiece joining jig 100. Examples of connectors that can be used in connection with recesses or cavities formed in the workpieces using this or other configurations of the workpiece joining jig 100 and associated additional components described herein include: dowels, dominos, butterflies, biscuits.

Further, depending on the configuration of the workpiece joining jig 100, workpieces may be able to be connected end-to-end, at 90 degree angles to one another as well as with connected mitered ends.

In FIG. 1, the workpiece joining jig 100 includes a template holding jig 102 holding a workpiece 104 adjacent a first template 106. The workpiece joining jig 100 is in a first configuration. In some embodiments, the workpiece joining jig 100 can only be provided in this configuration. In other embodiments, other configurations are provided, such as described below with regard to FIGS. 5-9.

Figure 2:
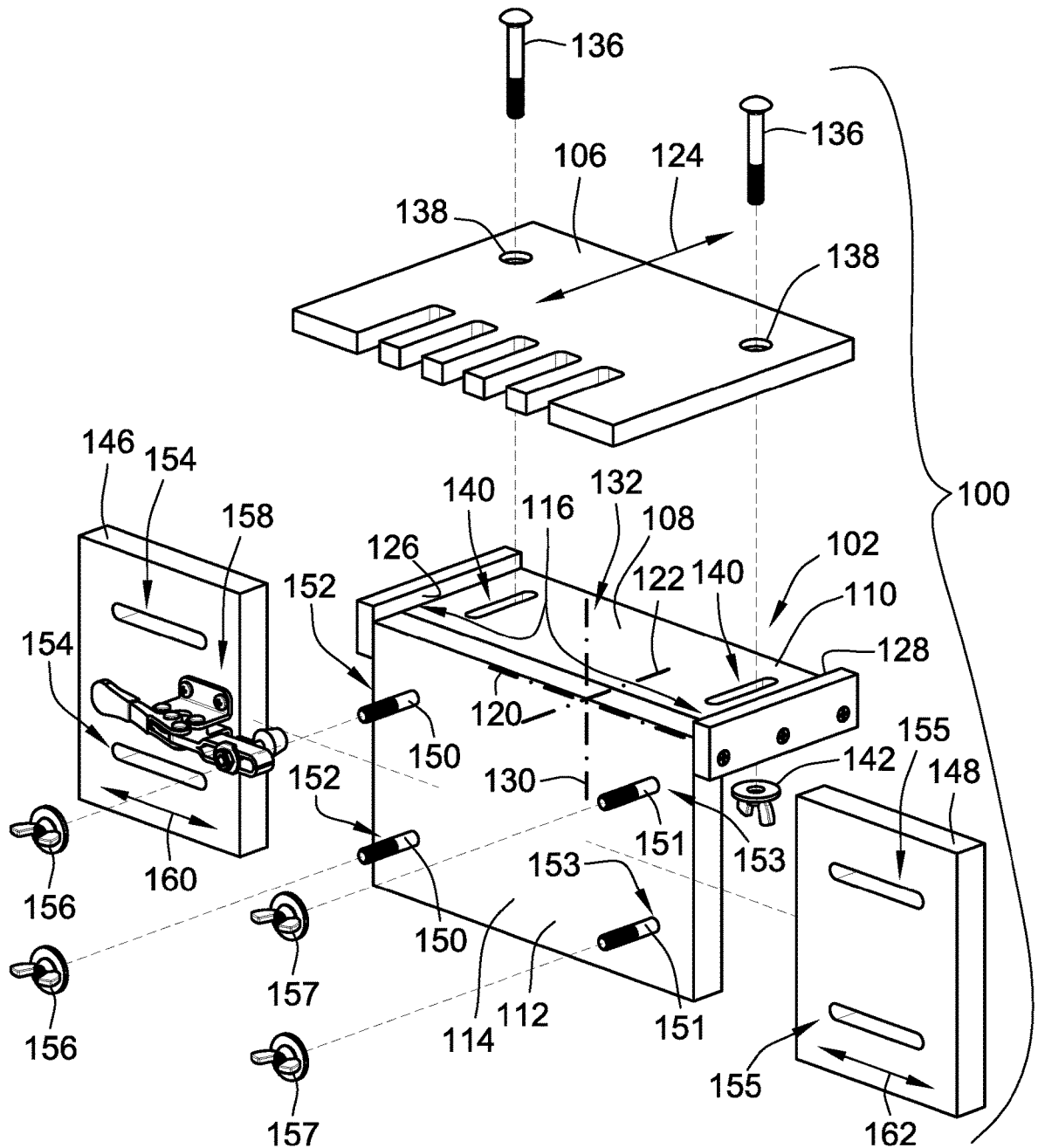
FIG. 2 is a perspective exploded illustration of the workpiece joining jig of FIG. 1.

With additional reference to FIG. 2, the template holding jig 102 includes a template support 108 defining a template support plane. Template 106 may operably removably and adjustably attach to the template holding jig 102 for properly orienting and positioning the template 106 relative to workpiece 104. A top surface 110 (also referred to as an exterior surface) of the template support 108 defines the template support plane. In the illustrated embodiment, the top surface 110 itself is planar defining the template support plane. However, the top surface 110 need not be planar and could have surface textures. These textures would define the template support plane upon which the first template 106 would be supported.

In addition to the template support 108, the template holding jig 102 includes a workpiece support 112 defining a planar workpiece support. Workpiece 104 may be operably held against the workpiece support 112 for properly orienting and positioning the workpiece 104 relative to the template 106 for proper routing of the workpiece 104. A front surface 114 (also referred to as an exterior surface) of the workpiece support 112 defines the workpiece support plane. In the illustrated embodiment, the front surface 114 itself is planar defining the workpiece support plane. Similar to the template support 108, the front surface 114 need not be planar and could have surface textures. These textures would define the workpiece support plane upon which the workpiece 104 would be supported.

The workpiece support plane extends perpendicular to the template support plane. As noted above, these planes are provided by exterior surfaces, e.g. they are exterior to the L-shape that is defined by the template support 108 and workpiece support 112. The exterior surface of the template support 108 does not extend beyond the exterior surface of the workpiece support 112. As such, it can be explained that the template support plane and the workpiece support plane define an exterior angle of 270 degrees therebetween.

This orientation allows the router to properly engage the workpiece 104 when guided by the template 106 depending on the type of connection being formed using the workpiece joining jig 100.

To properly orient the template 106 relative to the template holding jig 102 and particularly the workpiece support 114, a template guide 116 is provided. The template guide 116 of this embodiment includes at least one abutment that laterally locates the template 106 along a first axis 120. This allows the template to properly laterally align with the workpiece 104 when the template 106 is engaged with the template guide 116. The first axis is parallel to both the template support plane and the workpiece support plane. However, the template guide 116 permits motion of the template 106 parallel to a second axis 122 that is perpendicular to the first axis 120, orthogonal to the workpiece support plane and parallel to the template support plane. As such, in the illustrated embodiment, the template guide 116 allows the template to be adjusted parallel to second axis 122 illustrated by arrow 124 in FIG. 1.

In the illustrated embodiment, the at least one abutment of the template guide 116 includes a plurality of abutments provided in the form of by first and second walls 126, 128 formed by side plates that are attached to sides of the template support 108 and the workpiece support 112. The side plates can also be used to secure the template support 108 to the workpiece support 112. The first and second walls 126, 128 are parallel to one another and spaced apart from one another parallel to the first axis 120. Further, to engage the template 106, the first and second walls 126, 128 are offset from the template support plane, e.g. the top surface 110, parallel to a third axis 130 that is parallel to the workpiece support plane (e.g. front surface 114) and perpendicular to the first and second axes 120, 122 as well as orthogonal to the template support plane (e.g. top surface 110). In this embodiment, the first and second walls 126, 128 extend outward and beyond top surface 110 parallel to third axis 130.

The first and second walls 126, 128 are positioned at opposite first and second ends of the template support 108 with the template support 108 being positioned between the first and second walls 126, 128. This forms a template receiving channel 132 between the first and second walls 126, 128. Thus, when the template 106 is mounted to the template support 108, at least a portion of the template 106 is positioned axially between the first and second walls 126, 128 within the template receiving channel 132. However, it is contemplated that in alternative embodiments, the abutment could take other forms. For instance, the first and second walls 126, 128 could simply be provided by ends of the template support. In such an embodiment, the template itself could define a similar channel with a portion of the template support being positioned between walls of the template to properly locate the template 106 relative to the template support 108. Further, embodiments could use smaller or wider channels. Further, the walls need not be parallel along the third axis 130. For example, a non-rectangular groove could be formed in top surface 110 that extends axially parallel to the second axis 122 and the template 106 could have a corresponding projection that locates within the groove to properly laterally orient the template 106 along first axis 120. Again, the groove and projection could be inverted between the template support 108 and template 106. This would be a groove that is of a dovetail configuration to prevent disconnection of the template and the template support 108 in a direction parallel to the third axis 130.

The template holding jig 100 also includes a template attachment for operably affixing template 106 to the template support 108 while routing the workpiece 104. In the illustrated embodiment, the template attachment is in the form of a pair of bolts 136 that pass through holes 138 formed in the template 106, corresponding slots 140 in the template support 108, and a pair of wing nuts 142 (only one illustrated in FIG. 2). With the wing nuts 142 tightened, e.g. in a first configuration, the template 106 may be sandwiched against the template support 108 and prevented from moving parallel to the template support plane parallel to second axis 122. However, with the wing nuts 142 loosened or even removed, e.g. in a second configuration, the position of the template 106 may be adjusted along the second axis 122. The slots 140 allow the bolts 136 to slide therein. Adjustment of the position of the template 106 is limited to being parallel to second axis 122 due to template guide 116 and is illustrated by arrow 124 in FIG. 1. This allows the template 106 to be used with workpieces 104 of different thicknesses (the thickness being measured parallel to the second axis 122 when the workpiece 104 is mounted to the workpiece support 112). It is contemplated that the slots 140 and holes 138 could be reversed. Further, the bolts need not extend through the body of the template 106. Instead, the bolts or similar device could simply cantilever over the template 106 and provide an axial force parallel to third axis 130 to sandwich the template 106 against the template support 108. It is noted that the bolts 136 could also provide the template guide. The bolts and nuts provide a form of a clamping arrangement. Other clamping arrangements are contemplated. For instance, a handle with a cam surface mounted to an end of a shaft, e.g. a bolt, could pivot to releasably sandwich the template 106 into the template support 108. This applies to other nut and bolt arrangements described below.

Figure 3:
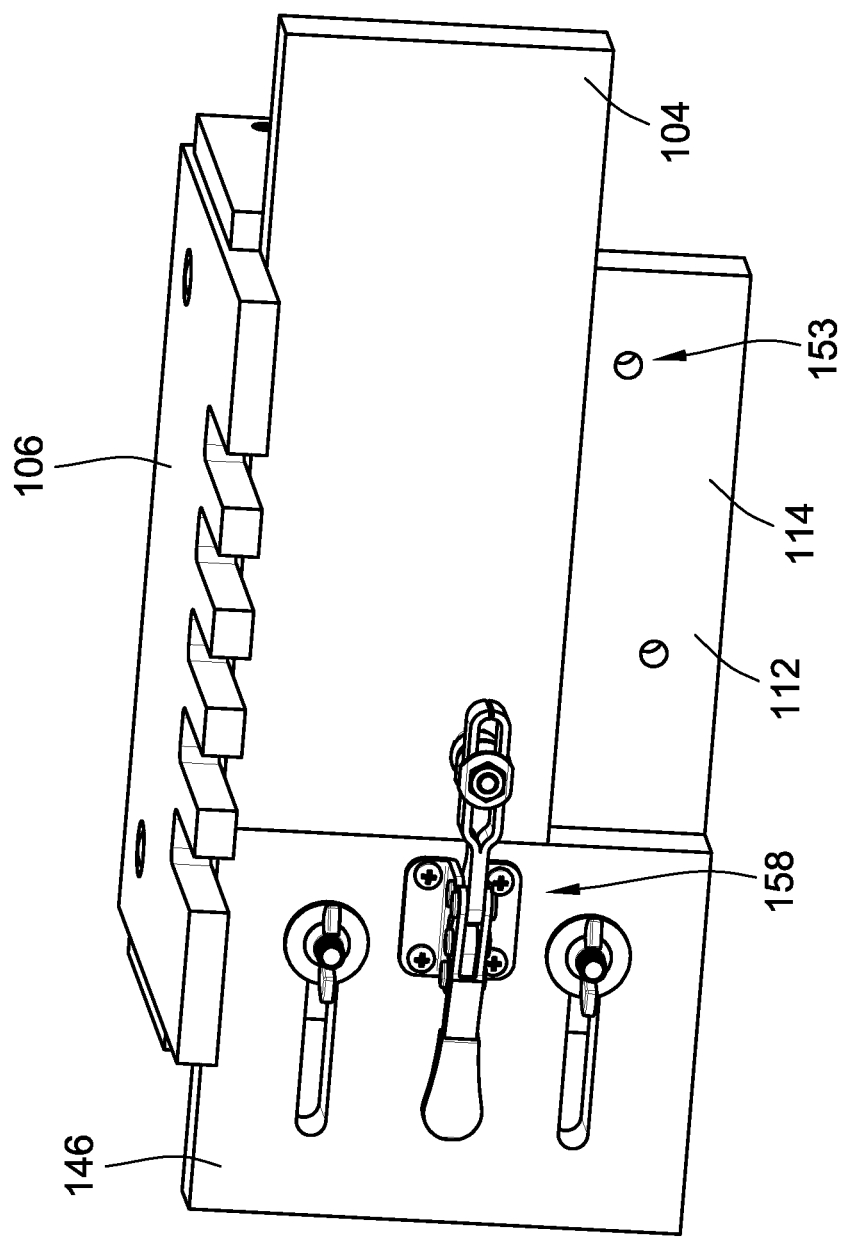
FIG. 3 is an alternative orientation of the workpiece joining jig of FIG. 1.
Figure 4:
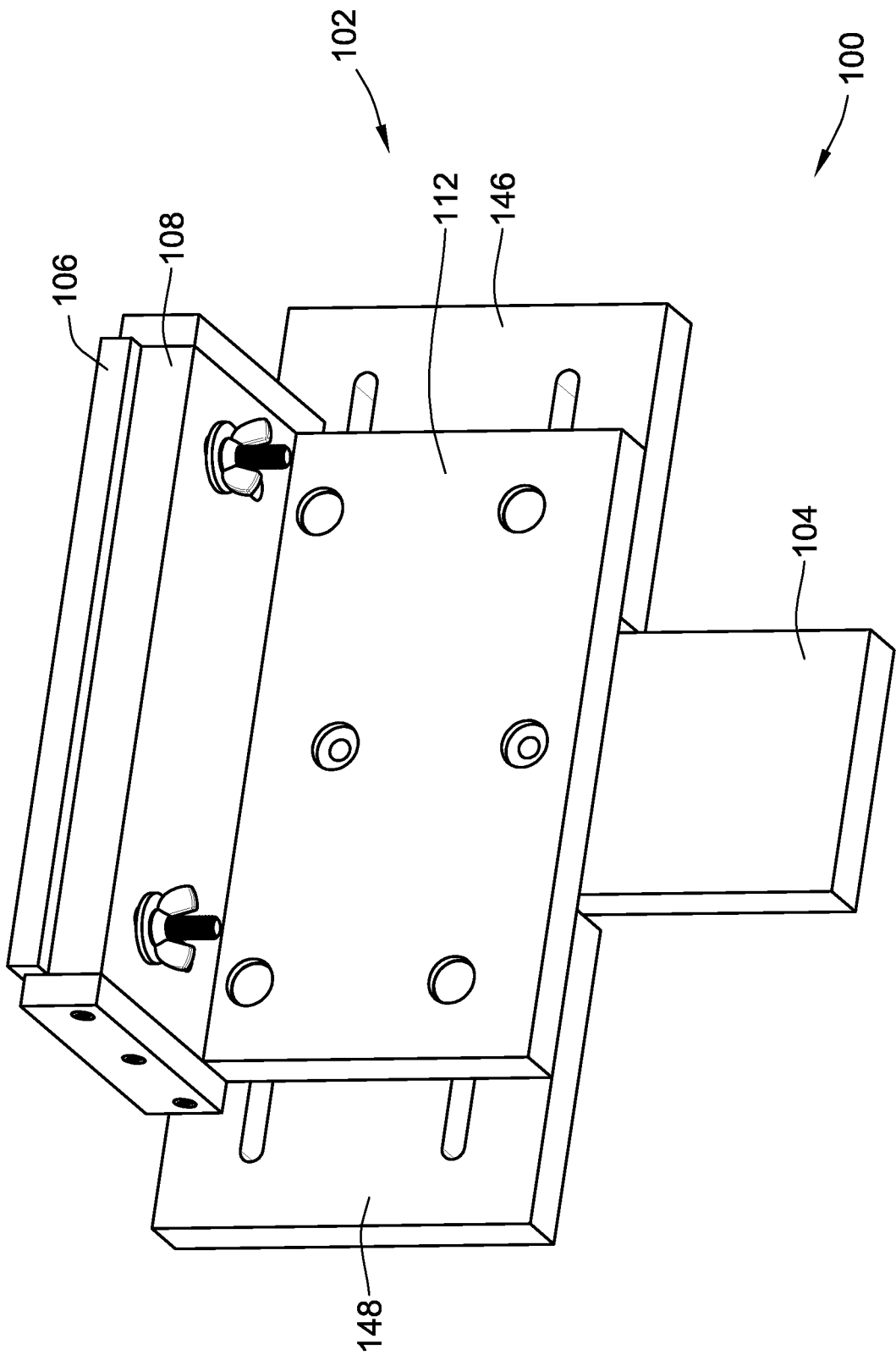
FIG. 4 is a rear view of FIG. 1.

In this configuration, the template holding jig includes first and second workpiece side stops 146, 148. The workpiece side stops 146, 148 are operably mounted adjacent the workpiece support 112 and laterally position the workpiece 104 relative to the template 106 parallel to the first axis 120. The workpiece side stops 146, 148 provide abutment against which the workpiece 104 abuts in a direction parallel to the first axis. The first and second workpiece side stops 146, 148 are adjustably positionable parallel to the first axis 120 relative to the workpiece support 122 to adjust a spacing therebetween when both workpiece side stops 146, 148 are being used. Preferably, one or both of the first and second workpiece side stops 146, 148 are removable away from the workpiece support 112 such that larger workpieces can be attached to the workpiece support 112 or longer workpieces can be properly oriented relative to the template 106 (see e.g. FIG. 3).

First and second workpiece side stop mounts in the form of bolts 150, 151, holes 152, 153 formed in the workpiece support 112, slots 154, 155 formed in the workpiece side stops 146, 148 and wing nuts 156, 157 selectively fix the position of the first and second side stops 146, 148 relative to the workpiece support 112 laterally along the first axis 120 (illustrated by arrows 160, 162). In an embodiment, the positions of the first and second workpiece side stops 146, 148 are independently adjustable along the first axis 120. In other embodiments, the positions are simultaneously adjusted relative to a center point located at the midpoint between the first and second walls 126, 128 such that the workpiece 104 can be auto-centered relative to the template 106. The slots 154, 155 and holes 152, 153 could be reversed such that the slots are formed in the workpiece support 112 and the holes are formed in the workpiece side stops 146, 148. Further, side stop guides could be provided similar to template guide 116 that guide the lateral positioning of the workpiece side stops 146, 148 as they move parallel to the first axis 120.

A clamp 158 is attached to the first workpiece side stop 146. The clamp 158 is thus movable with the first workpiece side stop 146 relative to the workpiece support 112. The clamp 158 is operably actuatable to provide a force orthogonal to the workpiece support plane (e.g. parallel to second axis 122) to a workpiece 104 that is supported by the workpiece support 112 and positioned adjacent the first workpiece side stop 146. Preferably, sufficient force can be provided by clamp 158 to prevent movement of the workpiece 104 during routing operations. Preferably, the clamp 158 is adjustable to accommodate workpieces 104 of different thicknesses and or material properties (e.g. to avoid damaging the contacted surface of the workpiece 104). While only a single clamp 158 is illustrated, multiple clamps may be provided. For example, a clamp could be mounted to the second workpiece side stop 148. Additionally, one or both of the workpiece side stops 146, 148 could include multiple clamps.

Figure 5:
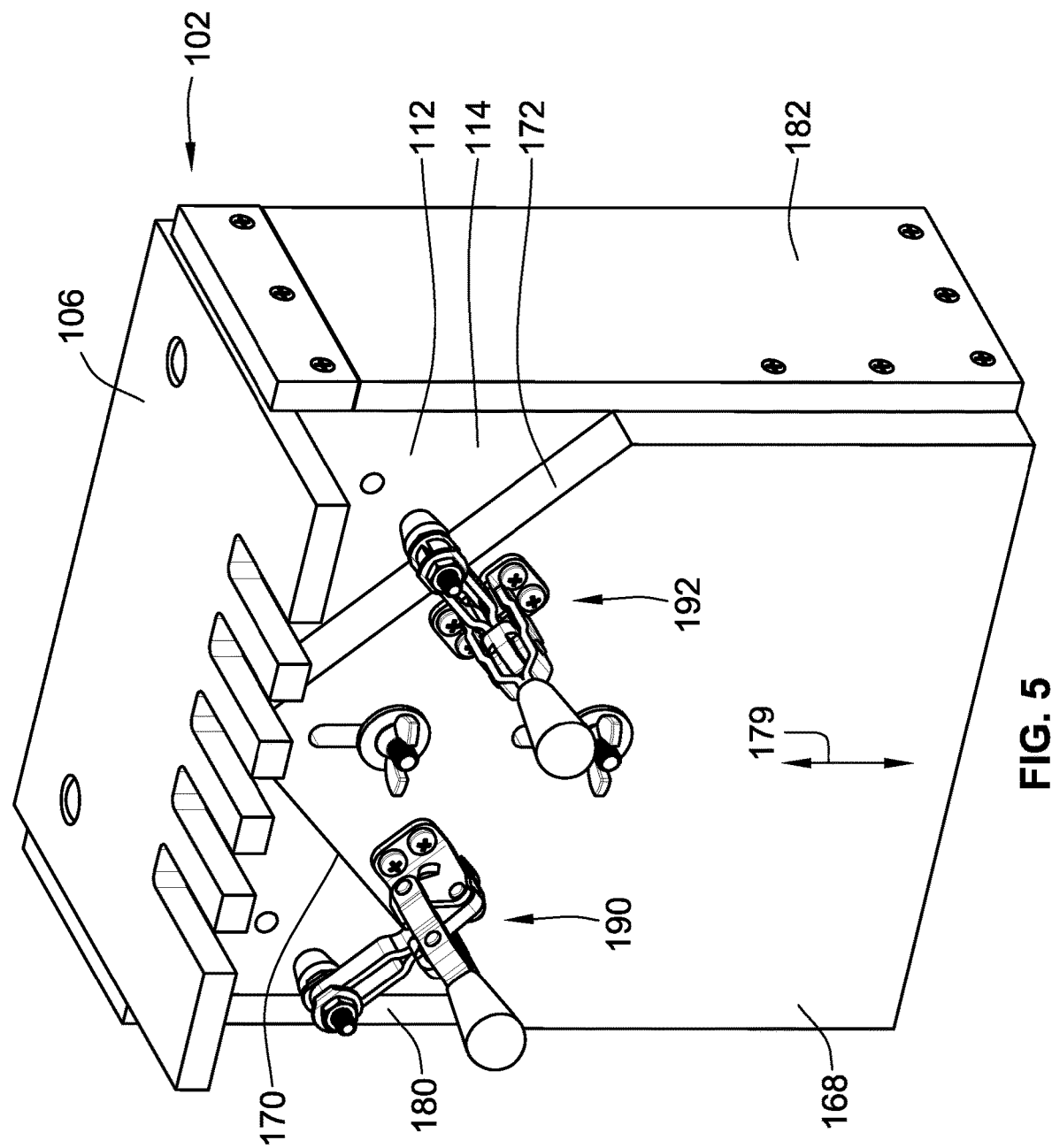
FIG. 5 is a perspective illustration of an alternative configuration of the workpiece joining jig.
Figure 6:
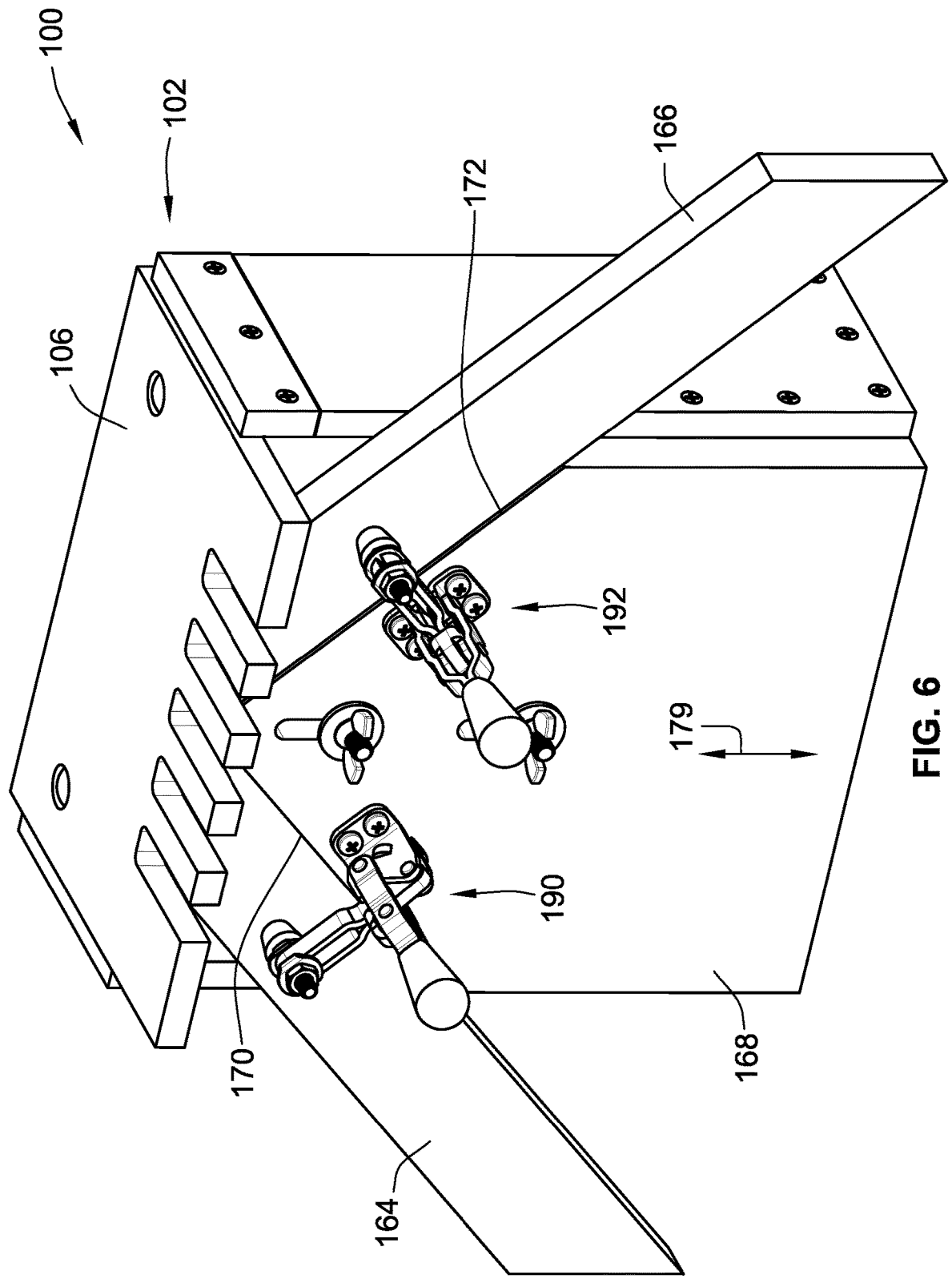
FIG. 6 is a perspective illustration of the workpiece joining jig of FIG. 5 supporting mitered workpieces.
Figure 7:
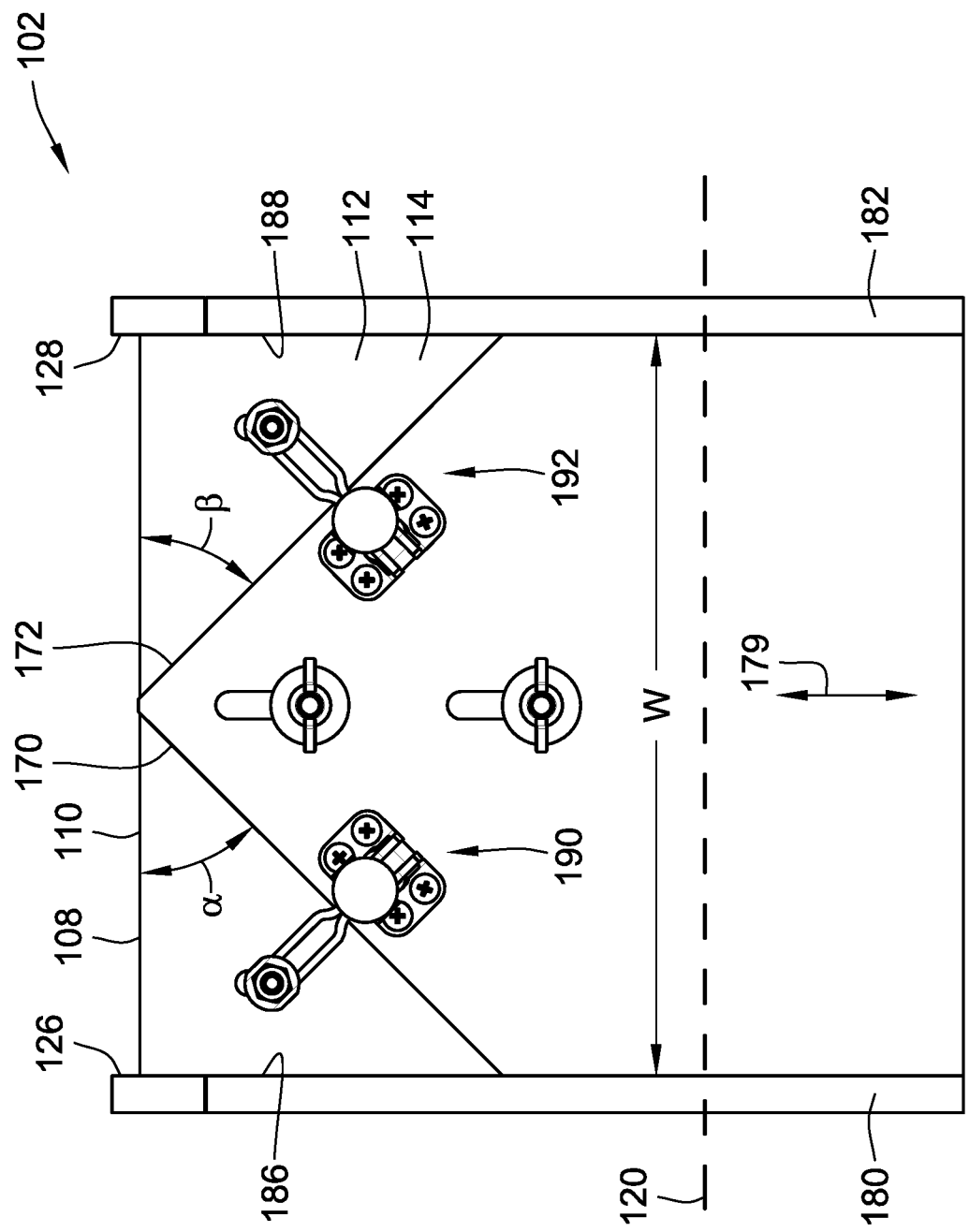
FIG. 7 is a front illustration of the workpiece joining jig of FIG. 5.
Figure 8:
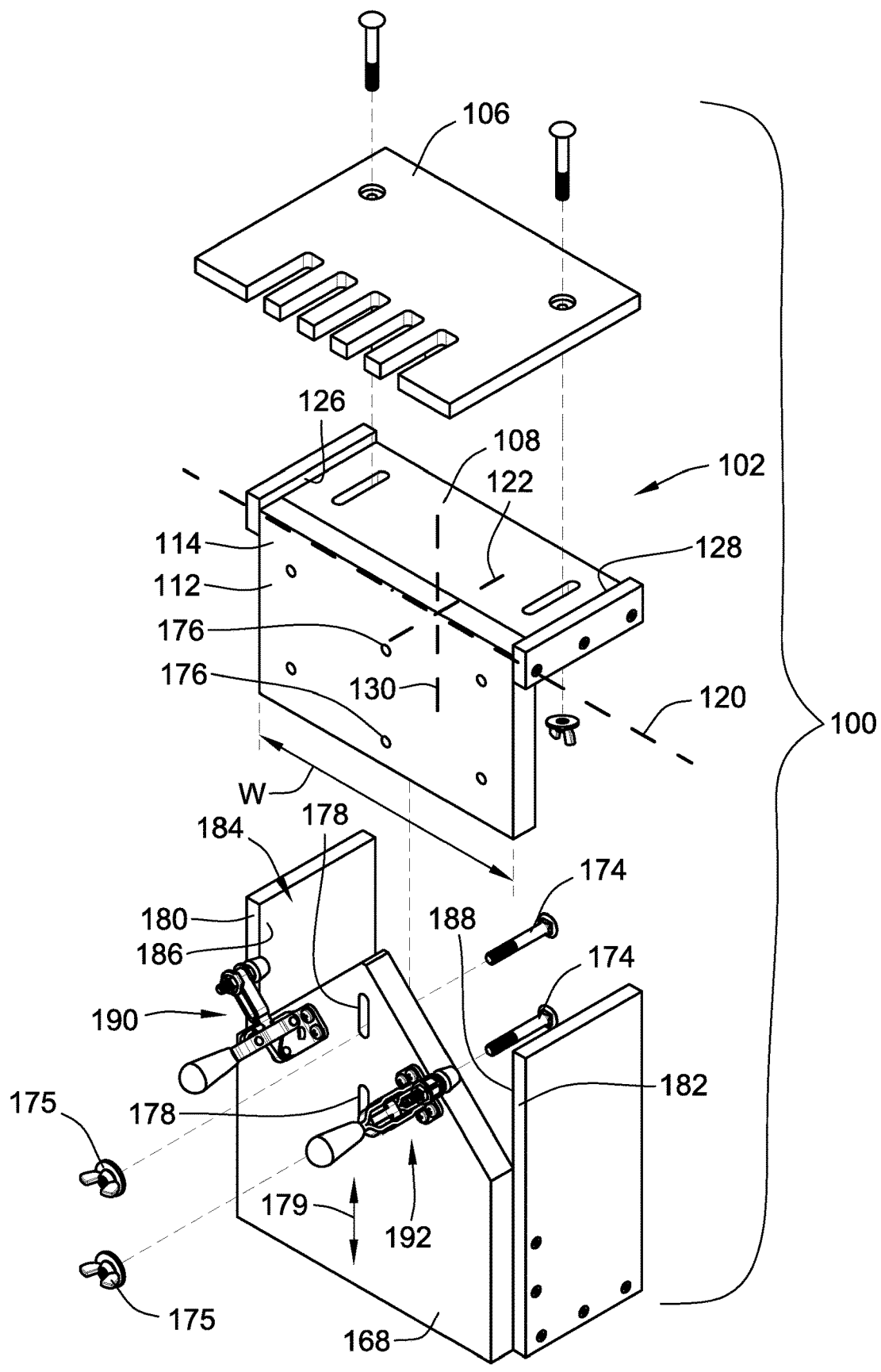
FIG. 8 is a partially exploded illustration of the workpiece joining jig of FIG. 5.

With reference to FIGS. 5-7, an alternative configuration of the workpiece joining jig 100 is illustrated. This configuration is useful in preparing connections for first and second workpieces 164, 166 that have mitered ends. In this configuration, a miter fence 168 is provided. The miter fence 168 allows the mitered ends to be properly positioned and oriented relative to the template 106.

The miter fence 168 defines first and second miter abutments in the form of first and second walls 170, 172. The first wall 170 defines a first miter abutment plane. This plane is defined by the exposed planar surface of the first wall 170. The first miter abutment plane extends orthogonally relative to the workpiece support plane and at a 45 degree angle α to the template support plane (e.g. top surface 110). The second wall 172 defines a second miter abutment plane. This plane is defined by the exposed planar surface of the second wall 172. The second miter abutment plane that extends orthogonally relative to the first miter abutment plane and orthogonally relative to the workpiece support plane and at a 45 degree angle β to the template support plane (e.g. top surface 110). These 45 degree angles α and β allow mitered ends of 45 degrees to be properly positioned adjacent the template 106.

In the illustrated embodiment, the first and second walls 170, 172 are positioned such that the corresponding first and second miter abutment planes intersect one another at a midpoint between first and second walls 126, 128 along the first axis 120.

The miter fence 168 is fixably attachable adjacent to the workpiece support 112. In the illustrated embodiment, the miter fence 168 is directly attached to the workpiece support 112 by a miter fence attachment in the form of bolts 174 and wing nuts 175. The bolts 174 that extend through holes 176 in the workpiece support 112 and slots 178 in the miter fence 168. In a first configuration of the miter fence attachment, e.g. when the nuts 175 are loose, the position of the miter fence 168 relative to the workpiece support 112 is adjustable (illustrated by arrow 179) parallel to the third axis 130 and the workpiece support plane as well as perpendicular to the template support plane and first and second axes 120, 122. In a second configuration of the miter fence attachment, e.g. when the nuts 175 are tight, the miter fence 168 is in a fixed position relative to the workpiece support 112.

Other miter fence attachments are contemplated. For instance, the bolts could simply cantilever over the fence and provide sufficient pressure to hold the components together. Further, the slots 178 and holes 176 could be swapped. Further, as with all of the other nuts described, handles with cams could be provided on the ends of the bolts to provide sufficient force to secure the components together and prevent relative motion therebetween.

In this configuration, the workpiece side stops 146, 148 and corresponding attachment structures have been removed to allow for mounting of the miter fence 168.

In the illustrated embodiment, first and second workpiece support guides 180, 182 are attached to the miter fence 168. The first and second workpiece support guides 180, 182 are spaced a part parallel to the first axis 120 forming a gap 184 therebetween. When the workpiece support 112 is attached to the miter fence 168, the workpiece support 112 is positioned between and in abutment with inner surfaces 186, 188 of the first and second workpiece support guides 180, 182. Inner surfaces 186, 188 face towards one another along the first axis 120. The spacing between the inner surfaces 186, 188 is substantially equal to the width W of the workpiece support 112, which is also substantially equal to the spacing between first and second walls 126, 128 and the width of the template support 110.

Clamps 190, 192 are attached to the miter fence 168. The first clamp 190 is actuatable to provide a force orthogonal to the workpiece support plane between the template support plane and the first miter abutment plane. The first clamp 190 clamps first workpiece 164 against, at least in part, the workpiece support 112 (see e.g. FIG. 6). The second clamp 192 is actuatable to provide a force orthogonal to the workpiece support plane between the template support plane and the second miter abutment plane. The second clamp 192 clamps second workpiece 166 against, at least in part, the workpiece support 112 (see e.g. FIG. 6).

Figure 9:
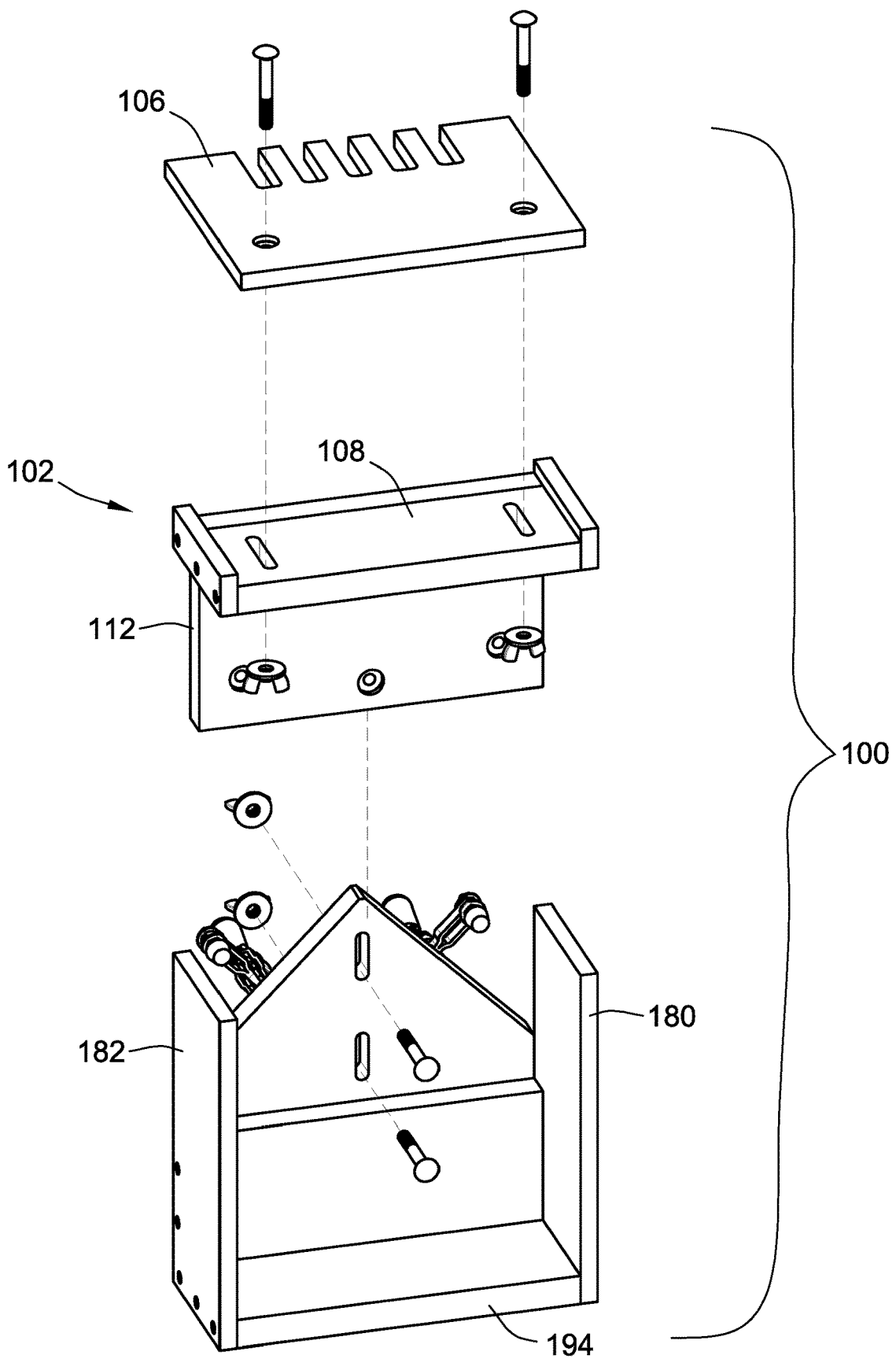
FIG. 9 is a rear view illustration of FIG. 8.

With reference to FIG. 9, the first and second workpiece support guides 182, 180 and miter fence 168 form a support base that is releasably attachable to the workpiece support 112 and template support 108. In this embodiment, a cross-member 194 extends between the first and second workpiece support guides 180, 182. A clamp, such as a bench clamp or C-clamp can clamp the support base to a table by engaging the cross-member 194.

In other embodiments, only the miter fence 168 need be provided and the workpiece support guides 180, 182 and cross-member 194 need not be provided.

Figure 10:
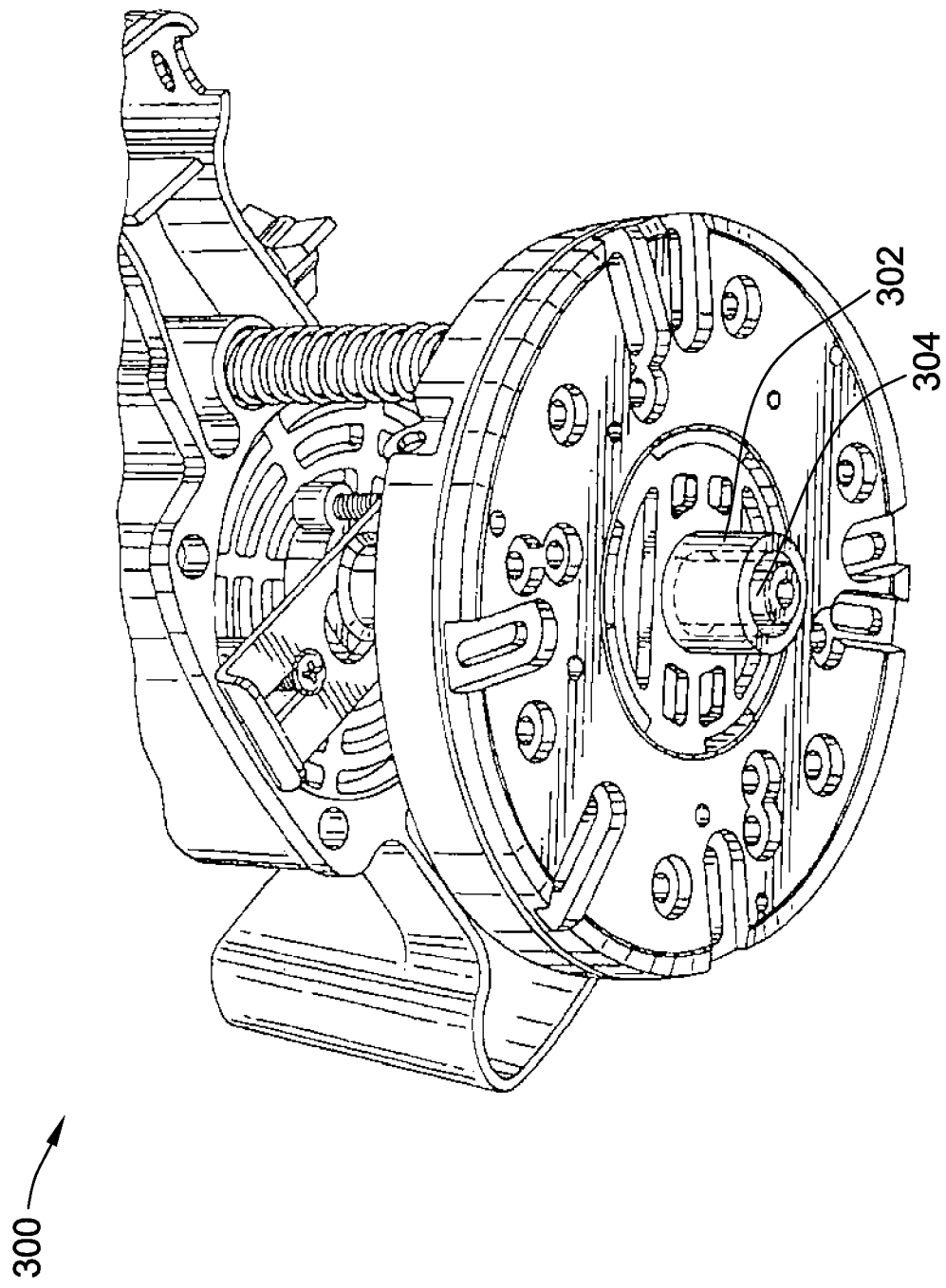
FIG. 10 is a perspective illustration of a router for use with the workpiece joining jig.

FIG. 10 illustrates a representative router 300 for use with the workpiece joining jig 100. The router 300 is in the form of a plunge router but other routers could be used. The router 300 includes a guide bushing 302 configured to radially abut a guide to guide the router during operation. The router 300 includes a chuck or collet 304 configured to attach a router bit (not shown) to the router 300 for rotational motion.

With reference to FIGS. 1 and 2, the first template 106 includes a plurality of first router guide regions in the form of elongated open ended slots 200. In this embodiment, the slots are evenly axially spaced apart along the first axis 120. These open ended slots 200 are generally U-shaped. While described as open ended, these slots 200 could be closed and still function appropriately. The open ended slots 200 are sized and configured to receive the guide bushing 302 of the router 300 to guide or limit the motion of the router 300 relative to the first template 106 in a predetermined manner. The predetermined manner allows the router 300 and particularly an attached router bit to engage workpiece 104 mounted to the workpiece support 112 in a precise and desired manner. The router guide regions, e.g. open ended slots 200, are designed to allow the router 300, to move parallel to the second axis 122 and arrow 124. This could be used for forming dovetails or recesses for butterfly connections. This could also be used for routing box joints.

Figure 15:
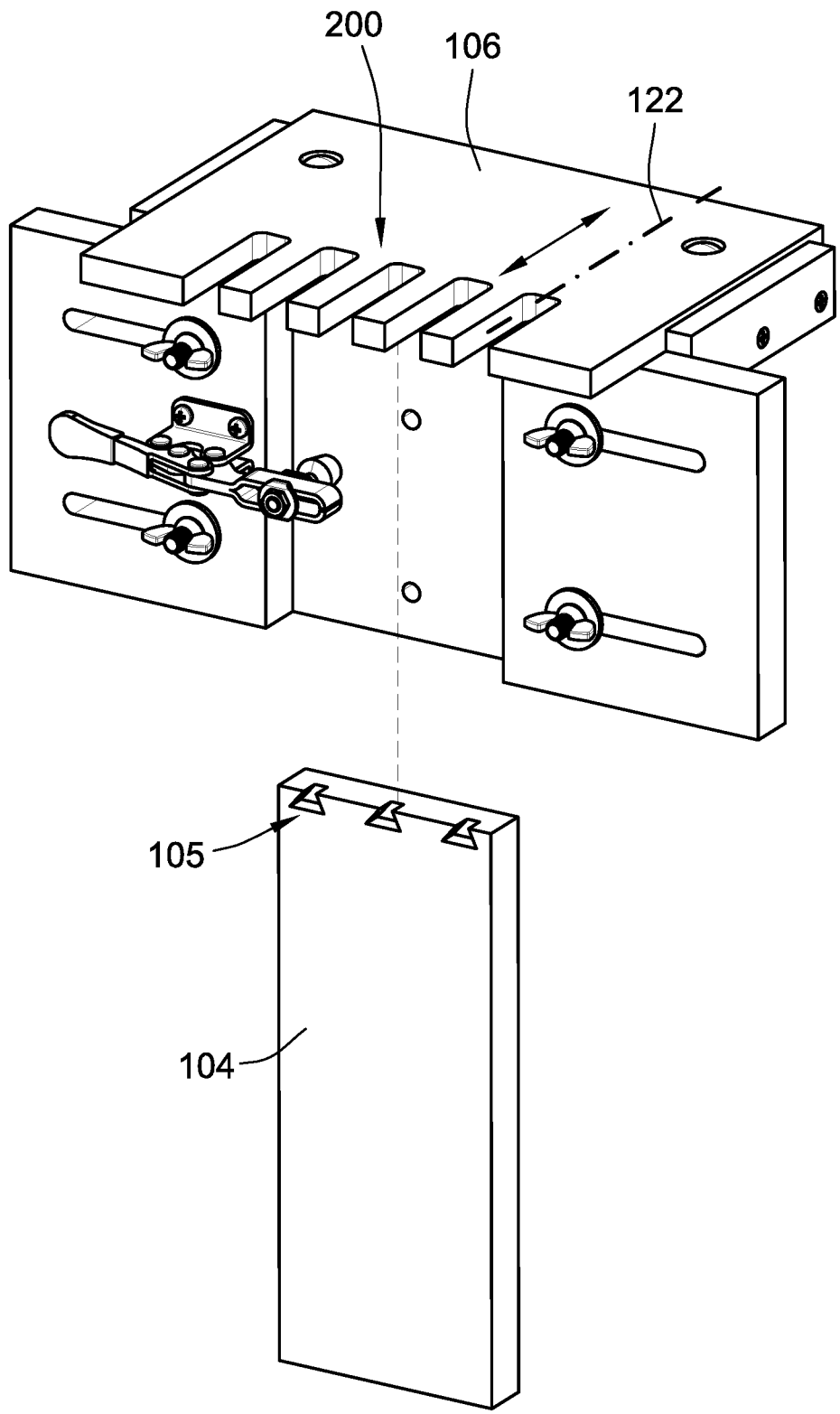
FIG. 15 is a perspective illustration of FIG. 1 illustrating a workpiece that has been routed for forming butterfly connections.

Instead of dovetails, this template could also be used for forming a recess that would receive a butterfly connector. For example, FIG. 15 includes first template 106 and a workpiece 104 that illustrates recesses 105 for forming butterfly connections. The router would be guided for linear motion along second axis 122 to form the recesses 105.

Figure 11:
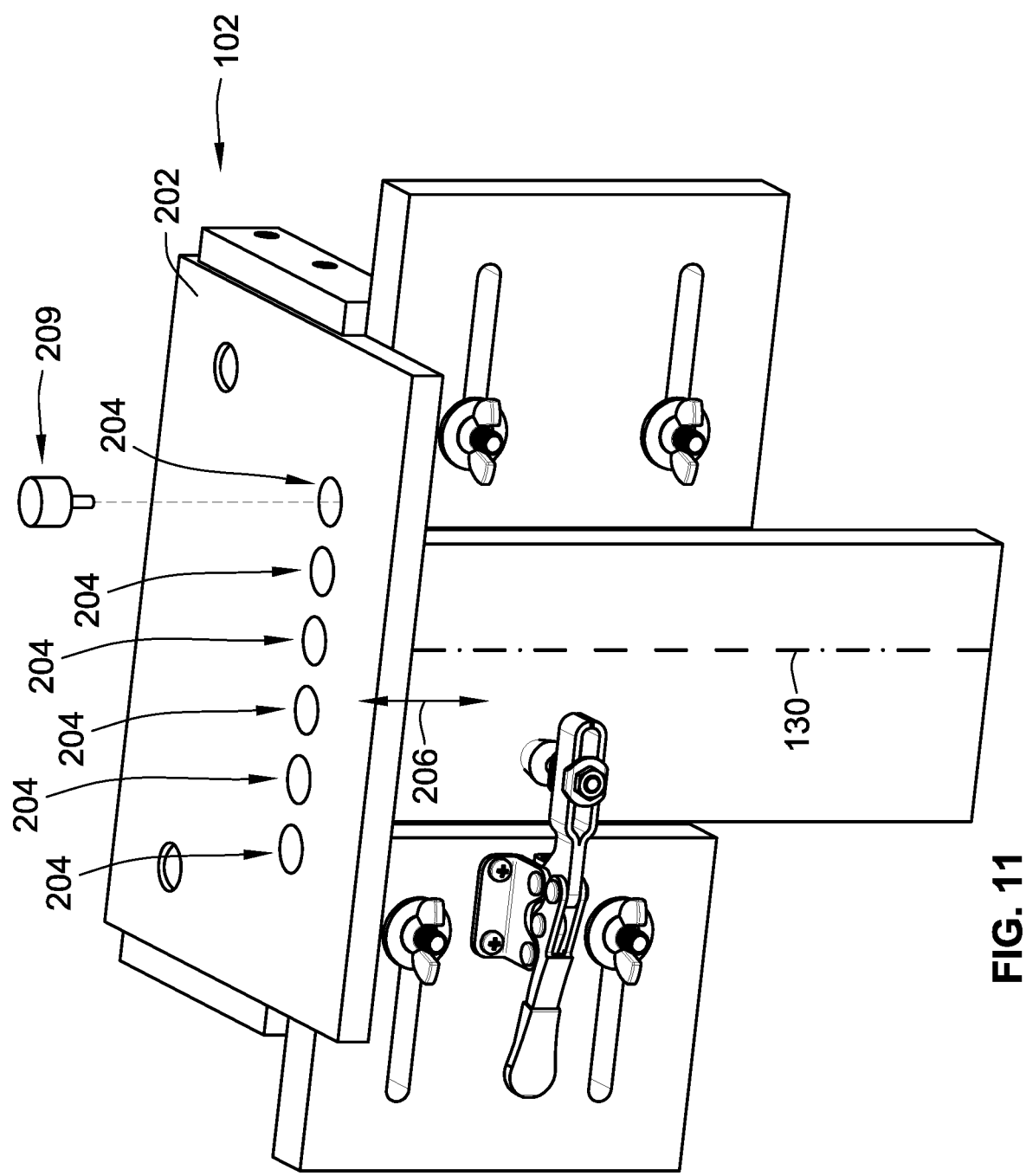
FIG. 11 is a perspective illustration of an alternative template for use with the workpiece joining jig.

However, use of other templates is contemplated. For example, a second template 202 is illustrated in FIG. 11. The second template 202, like the first template 106, is removably mountable to the template support 108 in abutment with the template guide. In this embodiment, the second template 202, like the first template 106, is to be positioned between first and second walls 126, 128. Again, the position of the template 202 may be adjustably fixed relative to the template holding jig 102 along the second axis 122 by template attachment 134.

Figure 16:
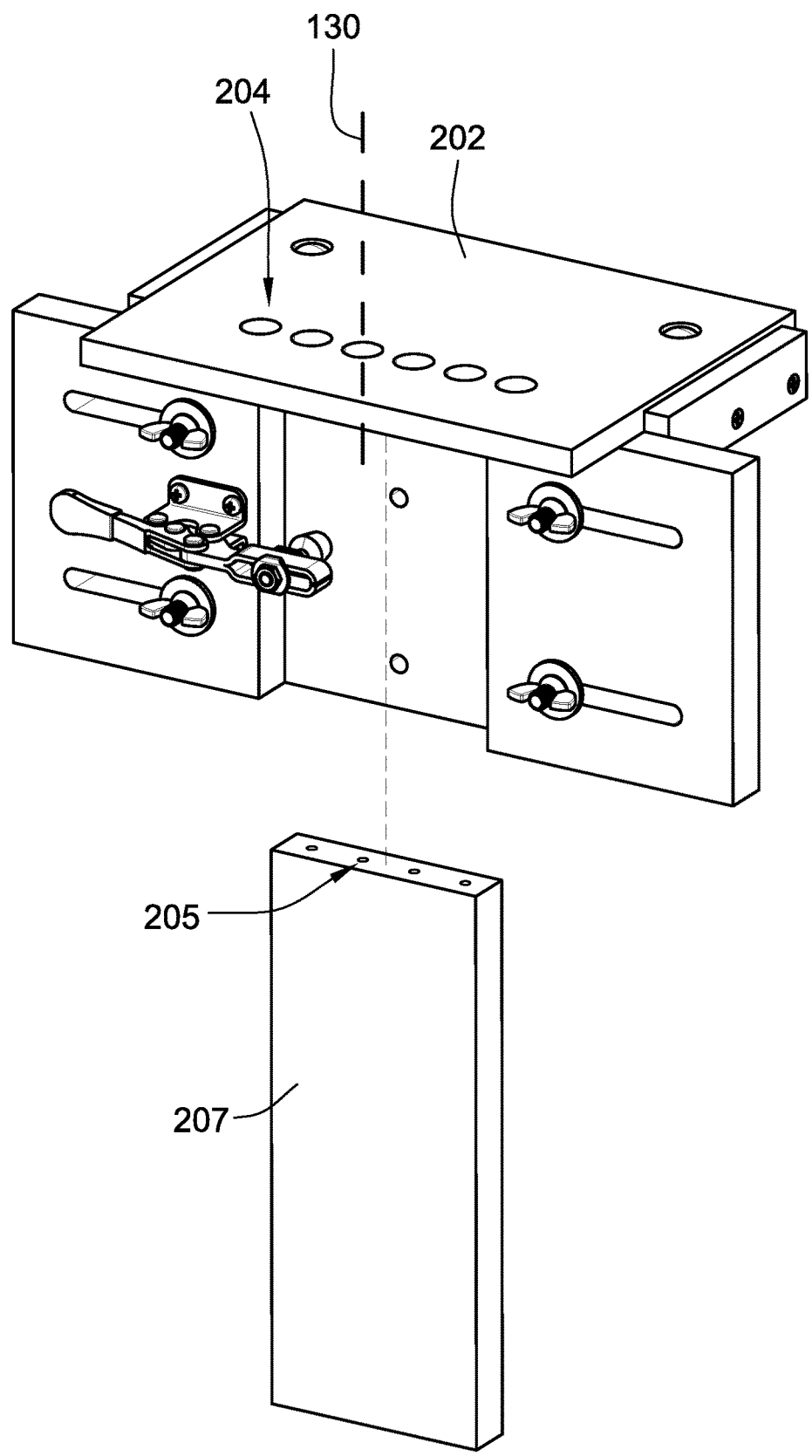
FIG. 16 is a perspective illustration of FIG. 11 illustrating a workpiece that has been routed for forming dowel connections.

The second template 202 has a plurality of second router guide regions in the form of through holes 204. The through holes 204 provide for a different predetermined range of motion for the route 300, and particularly the bit thereof. This allows the router 300 to engage a workpiece mounted to the workpiece support 112 in a different manner than the first template 106. In this embodiment, the through holes 204 allow the router bit to be linearly actuated parallel to third axis 130 but it cannot move in any other directions, e.g. parallel to the template support plane. This template allows bores 205 to be made into the workpiece, such as by using a plunging action parallel to the third axis 130 with the router 300. This is efficiently performed using a plunge router. This could be used for making joints that use dowels. For example, FIG. 16 includes second template 202 and a workpiece 207 that illustrates bores 205 for forming dowel connections. The router would be guided for linear motion along third axis 130 to form the bores 205.

Further, the second template 202 could be used to form rows of holes, such as for a peg board or shelving unit. Further, template locating pin 209 can be located in the last through hole 204 in the second template 202 and located in the last hole formed in the workpiece to align the template for forming more holes. This would allow for an unlimited number of holes to be provided in each row.

Figure 13:
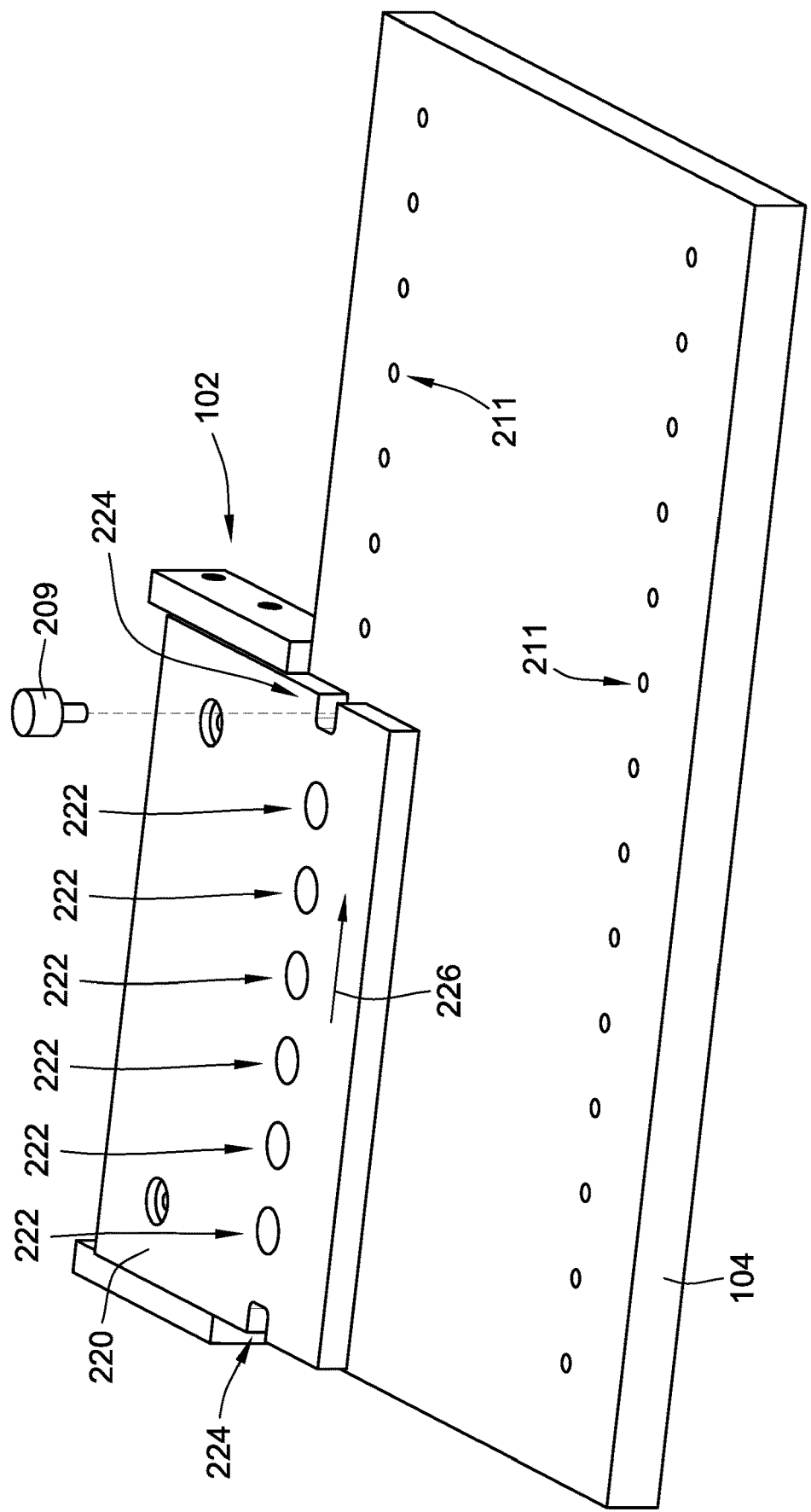
FIG. 13 is a perspective illustration of a further alternative template for use with the workpiece joining jig.
Figure 14:
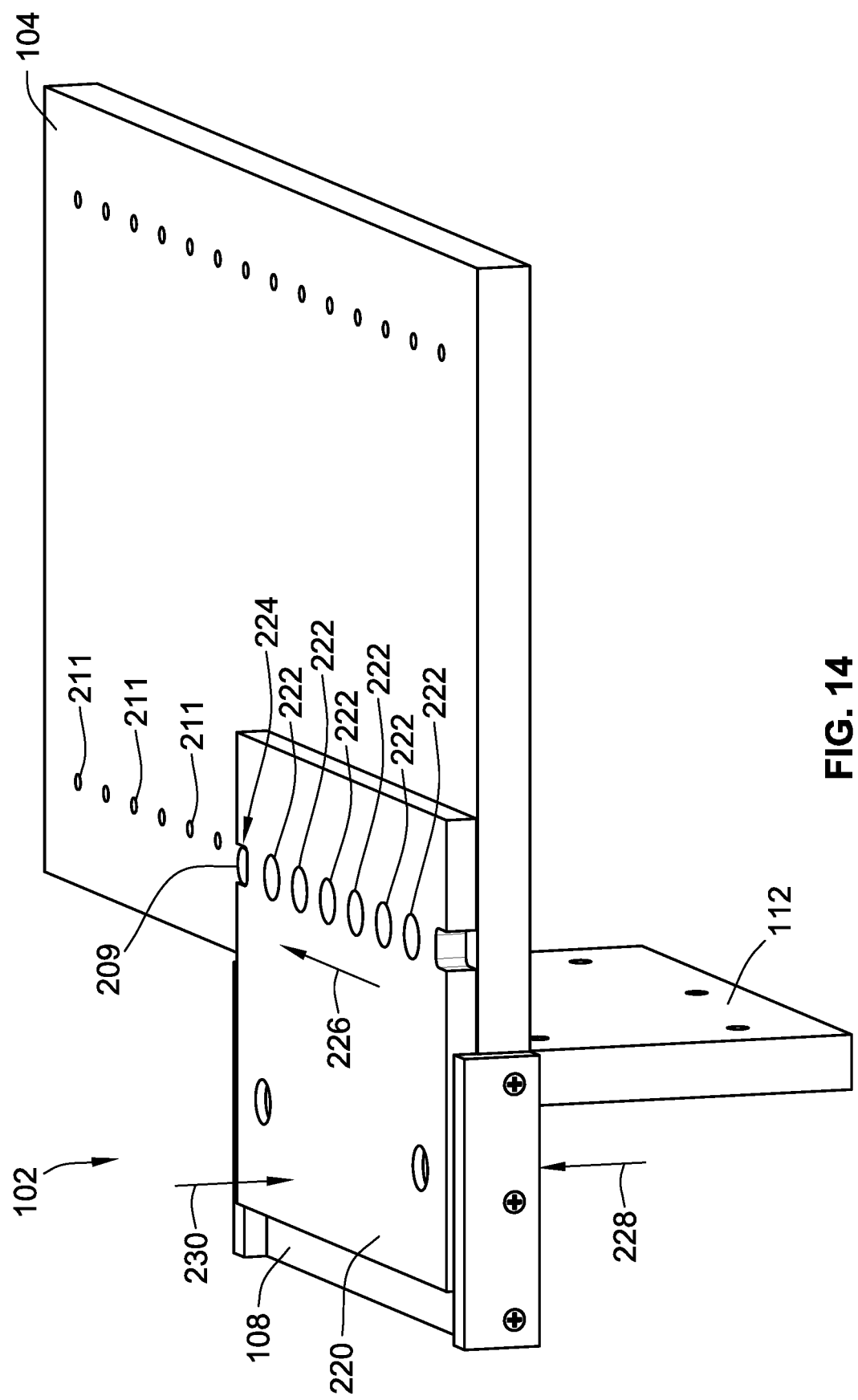
FIG. 14 is an alternative illustration of FIG. 13.

A fourth template 220, illustrated in FIGS. 13 and 14, similarly includes through holes 222 and is similar to the second template 202. However, the fourth template 220 includes open ended notches 224 at opposed sides thereof. The open ended notches 224 allow for easier engagement with locating pin 209. In this embodiment, the template holding jig 102 and particularly the workpiece support 112 (see FIG. 14) can simply be abutted against the appropriate side of the workpiece 104 and then slid axially against the pin 209 to properly axially align the fourth template 220 relative to the previously formed holes 211 in the workpiece 104 for formation of the next set of holes in the row. The axial alignment ensures proper axial spacing of the previously formed holes 211 and the new holes that are going to be formed after the jig has been moved axially relative to the workpiece 104.

In a preferred implementation, the template holding jig 102 is sized to be held by hand. This is illustrated schematically by arrows 228, 230 in FIG. 14. This allows for easy formation of such rows of holes. More particularly, in such an embodiment, the thickness of the second template 202 or fourth template 220 and the template support 108 is small enough to be gripped by a user's hand while leaving the other hand free to operate the router 300. Preferably, this combined thickness is less than 2 inches.

Figure 12:
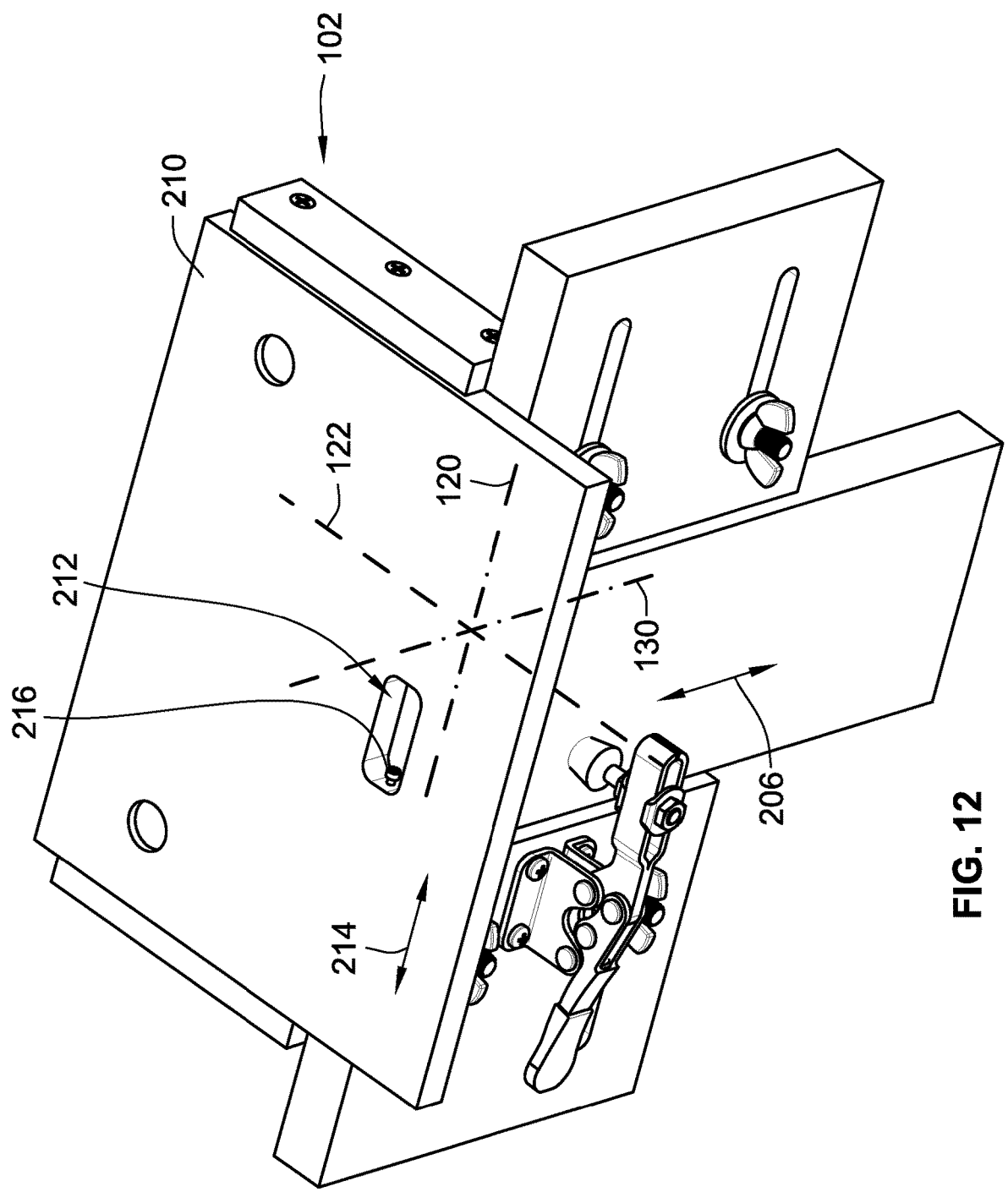
FIG. 12 is a perspective illustration of a further alternative template for use with the workpiece joining jig.
Figure 17:
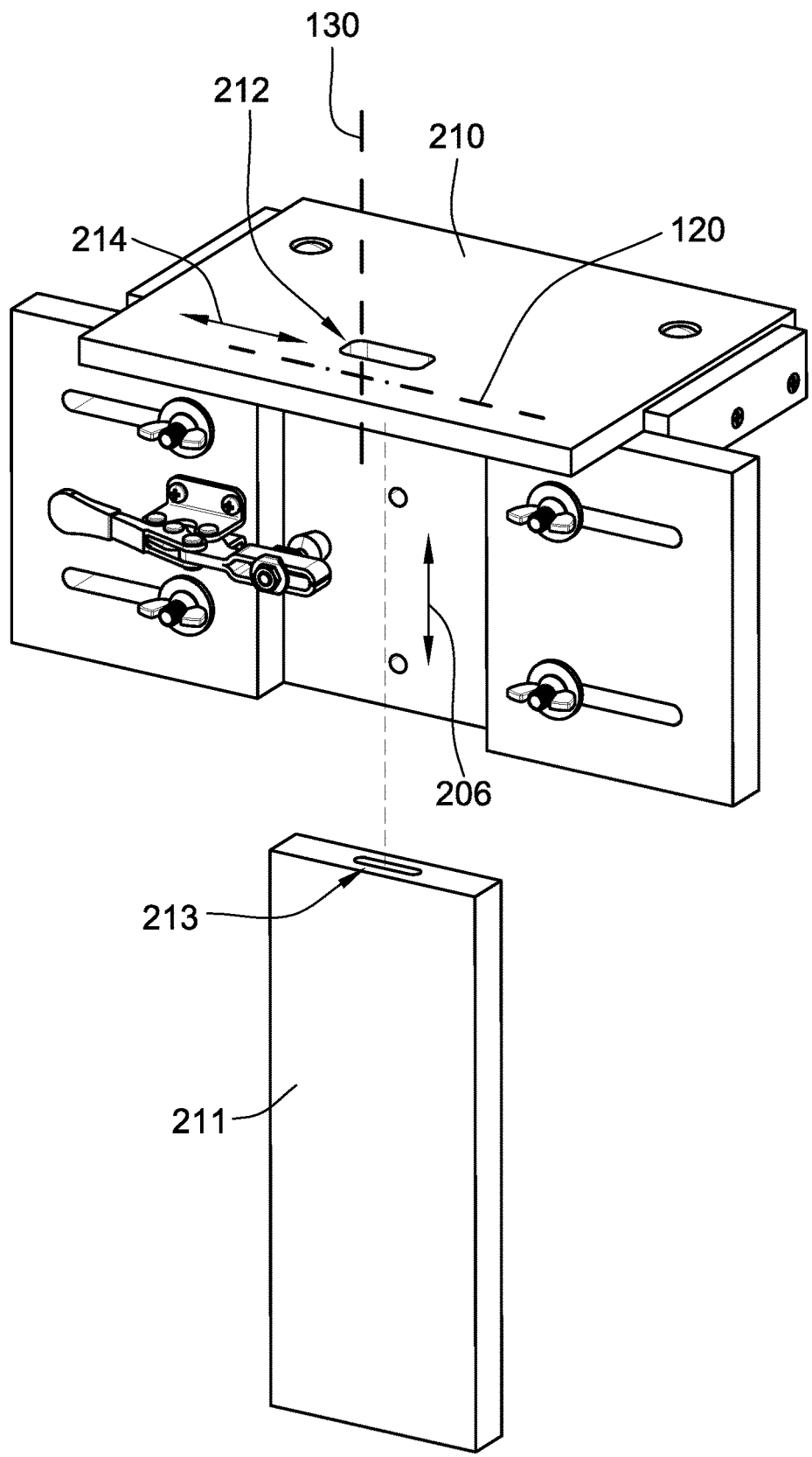
FIG. 17 is a perspective illustration of FIG. 12 illustrating a workpiece that has been routed for forming domino connections.

FIGS. 12 and 17 illustrate a third template 210. Third template 210 is similar to the first and second templates 106, 202 but with a third router guide region in the form of a fully closed elongated slot 212. The elongated slot 212 can be used to form elongated pockets 213 in work piece 211 such as pockets for dominos or biscuits. The elongated slot 212 allows for predetermined motion both parallel to the third axis 130 and parallel to the first axis 120. Thus, again, a plunging motion, illustrated by arrow 206, is permitted parallel to third axis 130. However, to make the elongated pocket 213, the second degree of freedom illustrated by arrow 214 is also permitted. In this embodiment, the third template 210 is adjustable and includes a length adjuster in the form of an adjustment screw 216 to allow for selectively limiting the amount of motion by the router 300 parallel to the first axis 120. This allows for adjusting the amount of elongation provided for the elongated pocket.

Figure 18:
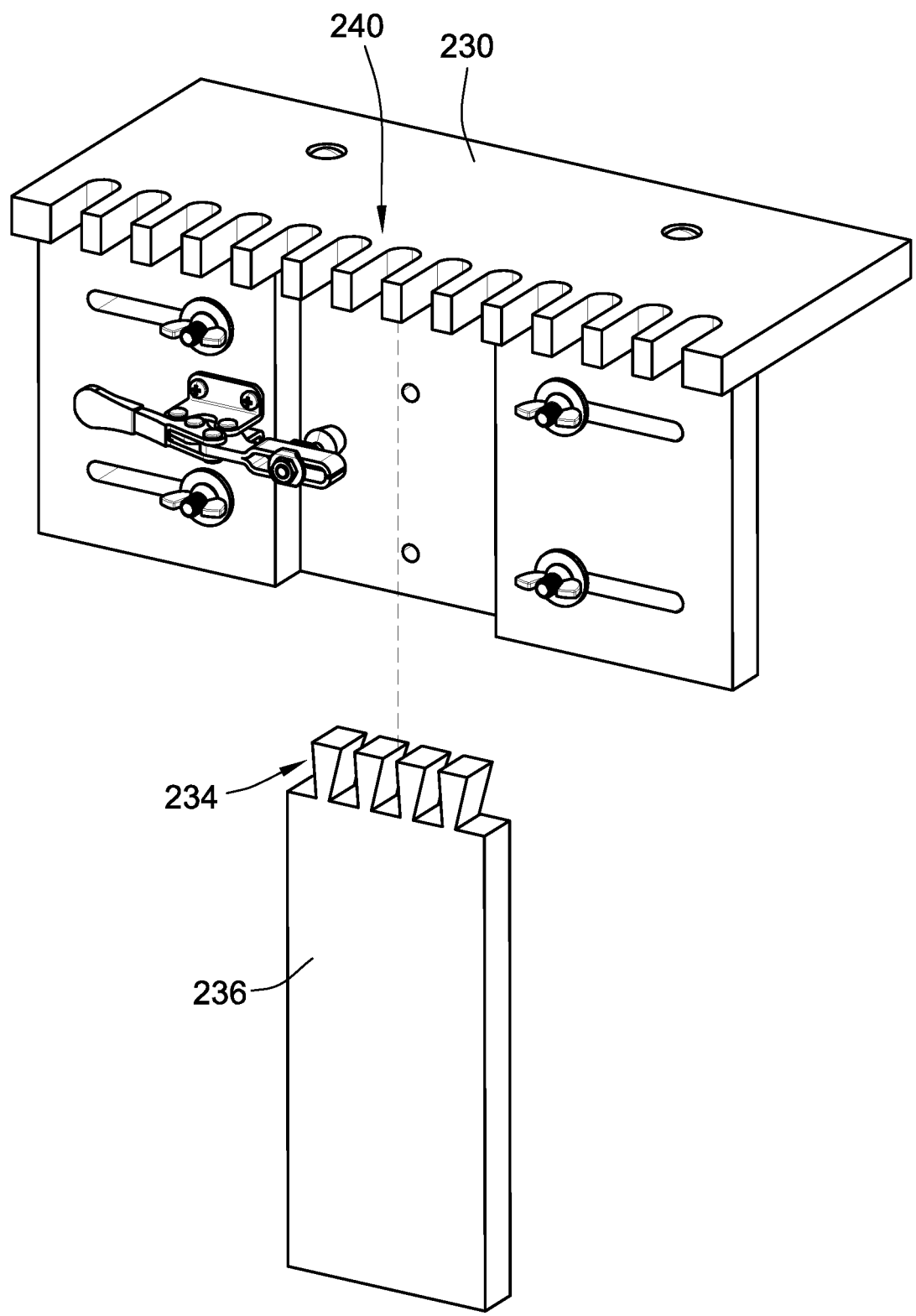
FIG. 18 is a perspective illustration of a further alternative template for use with the workpiece joining jig to form dovetail connections.
Figure 19:
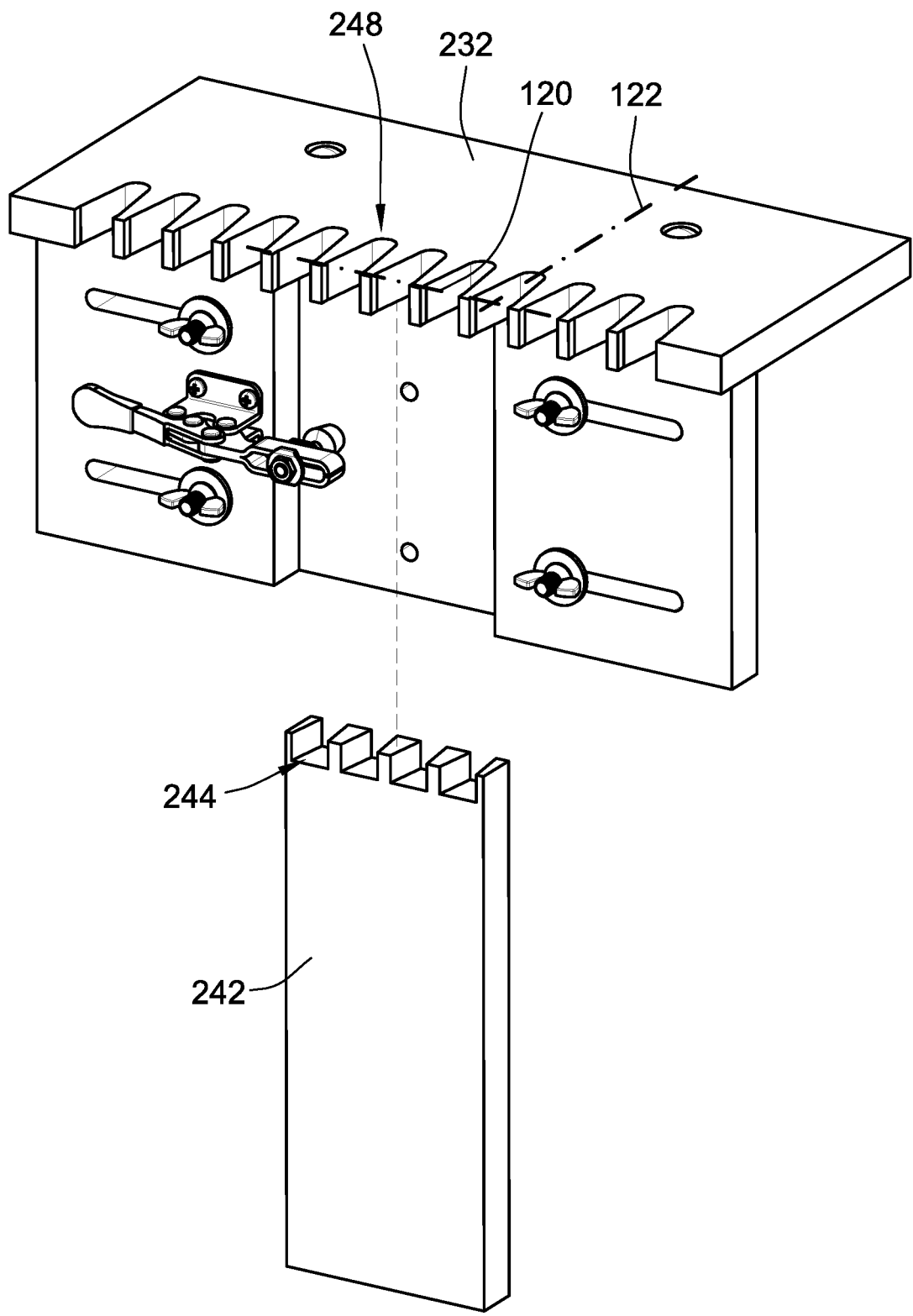
FIG. 19 is a perspective illustration of a further alternative template for use with the workpiece joining jig to form dovetail pins for cooperating with the workpiece formed using the template of FIG. 18.

FIGS. 18 and 19 illustrate fifth and sixth templates 230, 232. These two templates 230, 232 are used to form dovetail joints. The fifth template 230 is used to form the dovetails 234 in a first workpiece 236, e.g. to remove the material between adjacent dovetails 234 to form pin sockets. The fifth template 230 is substantially similar to first template 106 and includes a plurality of open ended elongated slots 240. These slots 240 guide motion of the router 300 just like elongated slots 200 discussed previously.

The sixth template 232 (FIG. 19) is used with a second work piece 242. This template 232 allows for formation of dovetail pins 244, e.g. by removal of the material between adjacent dovetail pins to form dovetail sockets. The dovetail pins 244 are axially received into the dovetails 234 of the first workpiece 236. The sixth template 232 includes tapered open ended slots 248. The taper provided by the sidewalls defining the tapered open ended slots 248 allow for the tapered dovetail pins 244 to be formed.

Figure 20:
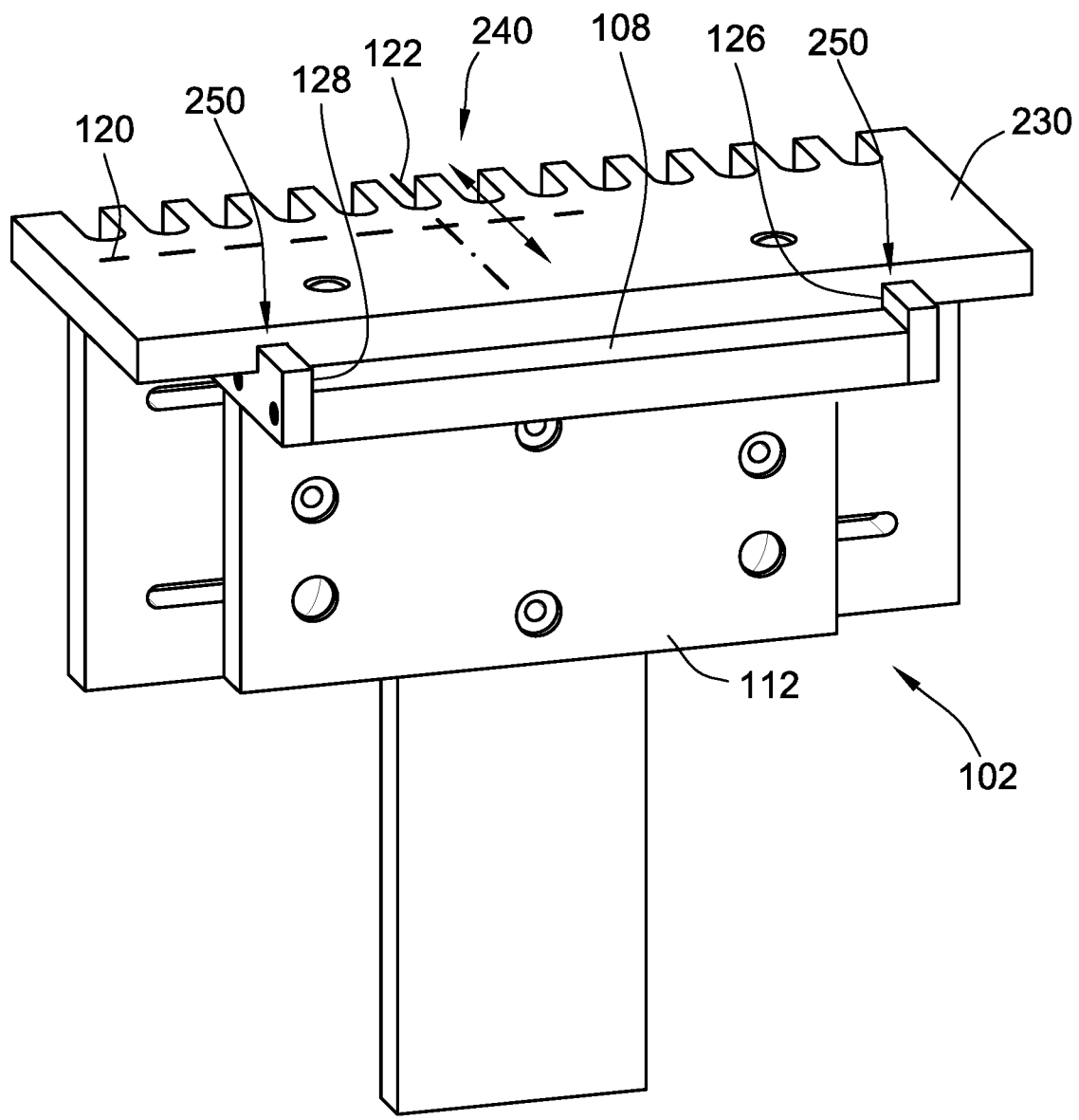
FIGS. 20 and 21 are rearview perspective illustrations of the templates of FIGS. 18 and 19.
Figure 21:
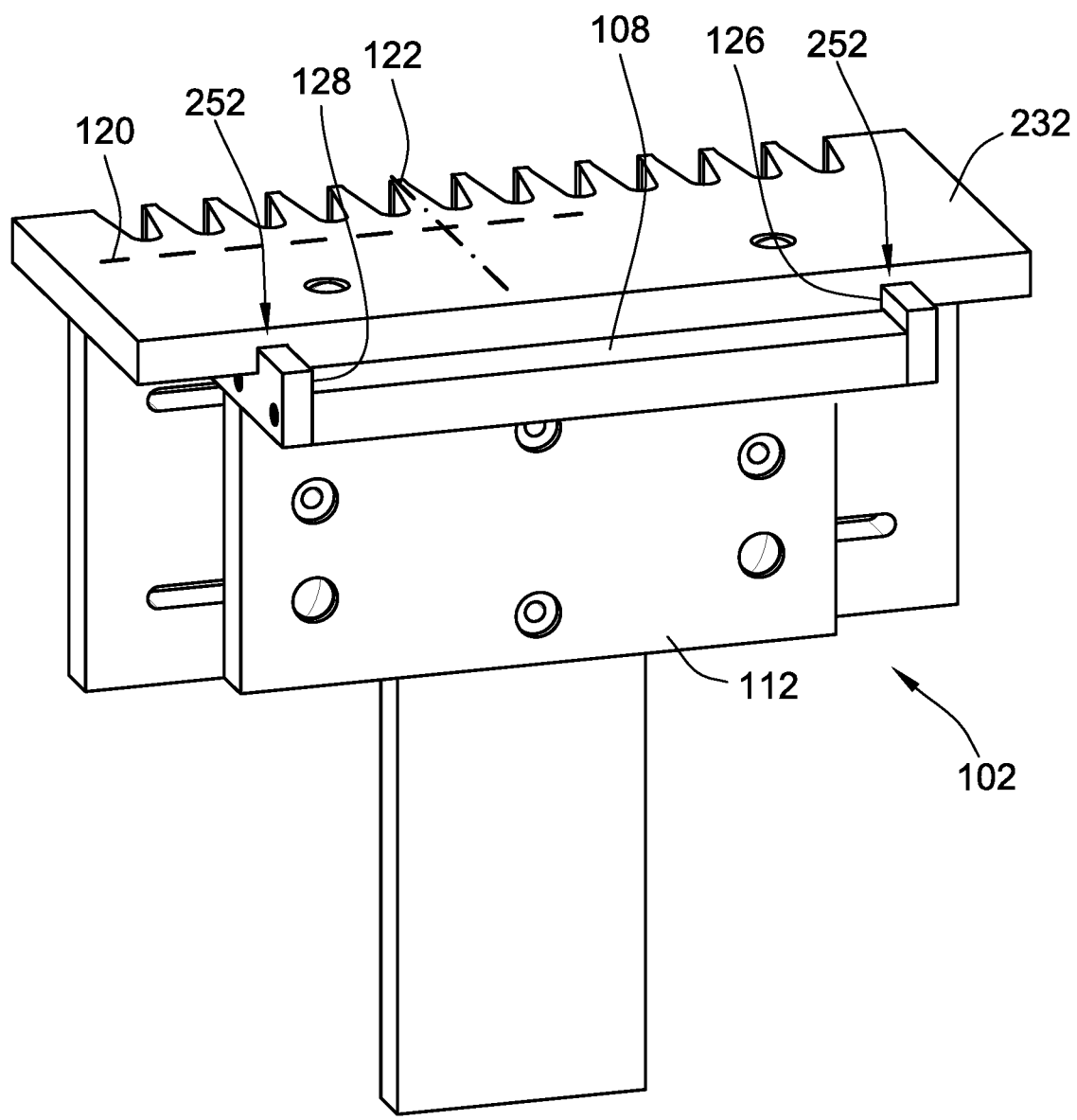

With reference to FIGS. 20 and 21, the fifth and sixth templates 230, 232 are wider than the template support 108. As such, the fifth and sixth templates 230, 232 have slots 250, 252 that receive the first and second walls 126, 128. These slots 250, 252 will align the fifth and sixth templates 230 parallel to first axis 120 but still allow axial sliding motion parallel to second axis 122. Again, other configurations are contemplated such as a dovetail relationship.

Figure 22:
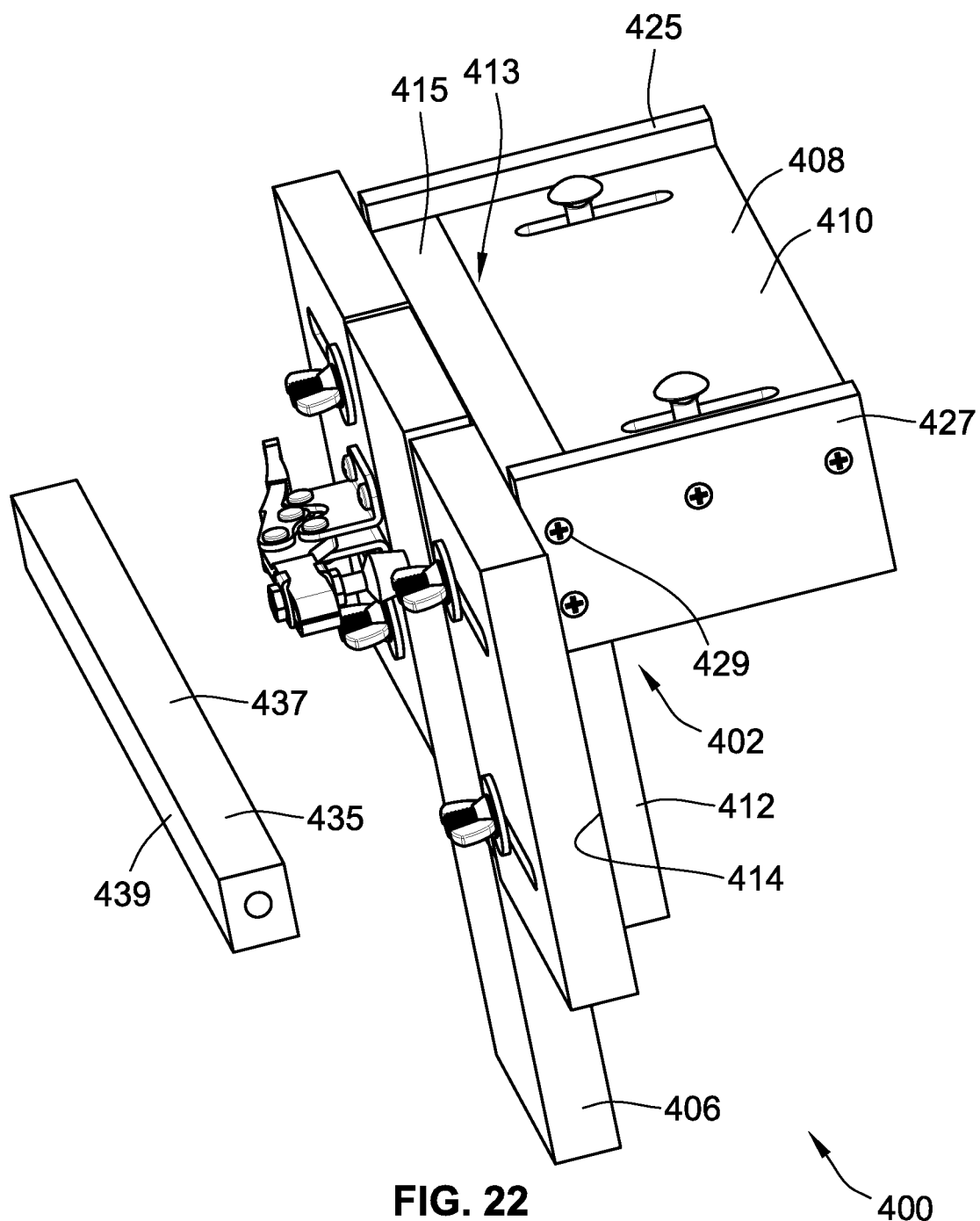
FIGS. 22-24 illustrate a configuration of a workpiece joining jig that incorporates a sacrificial support piece.

With reference to FIG. 22, an alternative configuration is provided. When forming some of the connections the router bit must pass entirely through the thickness of the workpiece. This is particularly true such as when forming dovetail joints or mortise and tennon joints. Workpiece joining jig 400 of FIG. 22 allows for such operation. Further, it is desirable to support the back side of the workpiece, e.g. the side that the router bit passes through second, so as to prevent tear outs of the portion of the workpiece that remains after forming the cut with the router bit. As such, it can be desirable to provide a sacrificial support piece that is pressed against the second side of the workpiece that the router bit extends into when forming the cut in the workpiece. Workpiece joining jig 400 provides one way of accommodating such a sacrificial support piece.

Workpiece joining jig 400 is similar to workpiece joining jig 100 and includes or can be modified to include all of the features and alternatives outlined above for workpiece joining jig 100. Each modification being a separate embodiment.

Workpiece joining jig 400 includes a template holding jig 402 used to support any of the templates outlined above. The template holding jig 402 includes a template support 408 that defines a template support plane 410 as well as a workpiece support 412 that defines a workpiece support plane 414. Again, like above, the template support plane 410 and workpiece support plane 414 are orthogonal to one another. However, unlike the prior template holding jig 102, the template support 408 and the workpiece support 412 are offset from one another to define a void 413 proximate the intersection of the template support plane 410 and the workpiece support plane 414 between ends of the template support 408 and the workpiece support 412 of the two components were extended. A sacrificial support piece 415 can be located within this void 413 when forming cuts that pass entirely through the thickness of the workpiece 406, e.g. through/into the workpiece support plane 414 of this embodiment.

Figure 23:
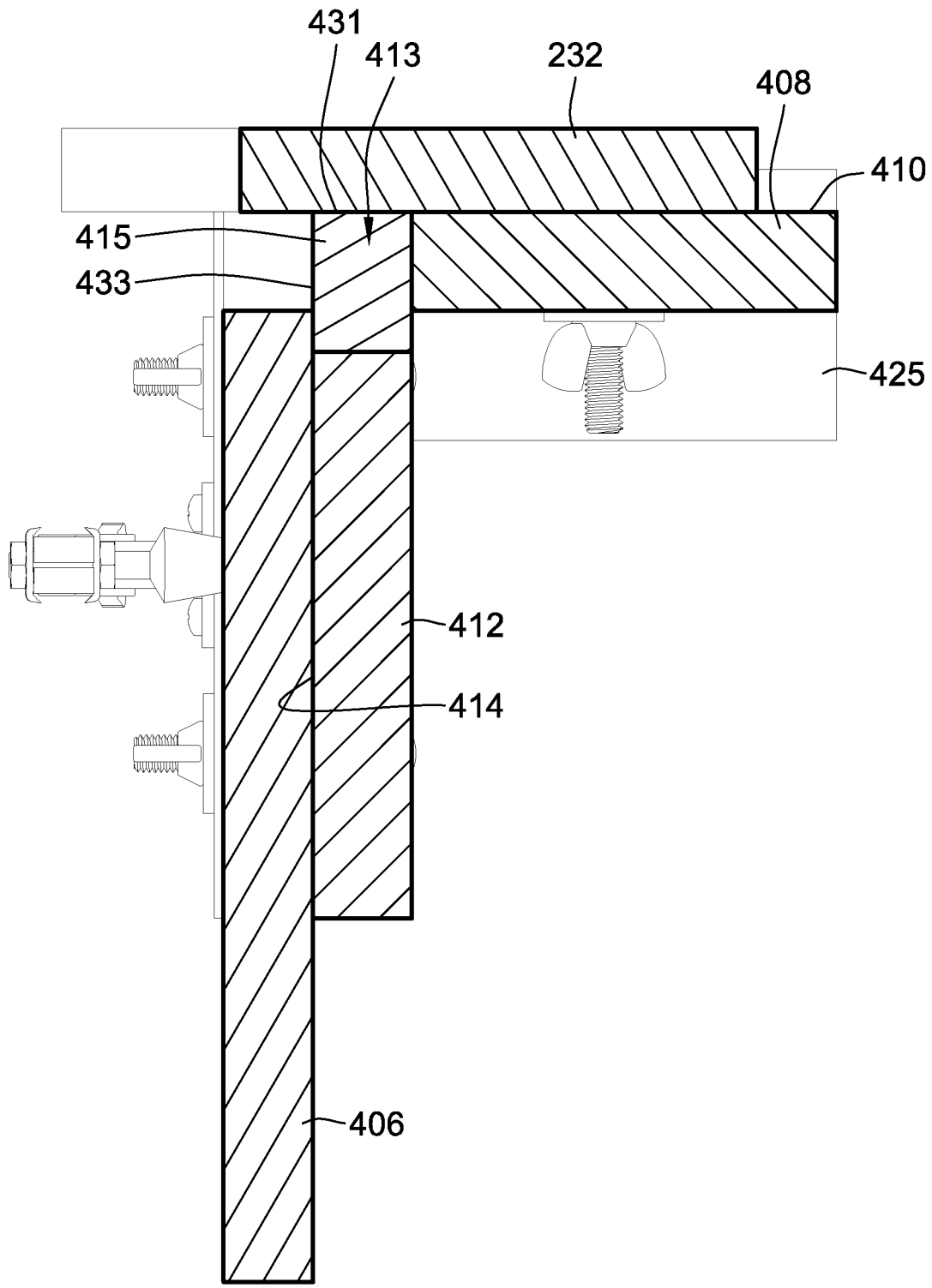
Figure 24:
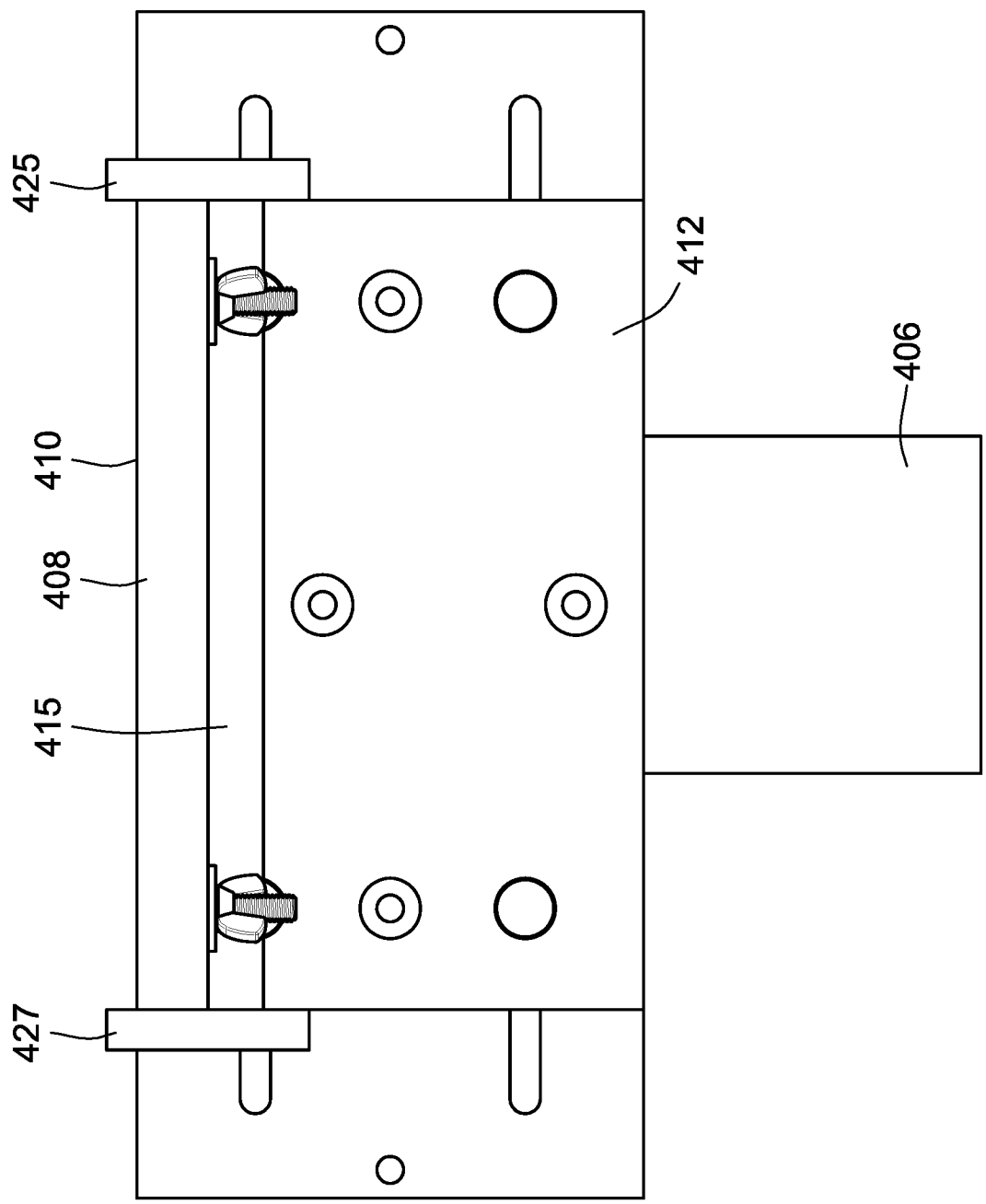

In this embodiment, the side plates 425, 427, which define the abutments for locating the templates, as described above, have been enlarged. As illustrated in FIG. 23, the template support 408 does not immediately overlap the workpiece support 412. As such, the enlarged side plates 425, 427 (only 425 shown in FIG. 23) are used to operably secure the workpiece support 412 to the templates support 408. The side plates 425, 427, templates support 408 and/or workpiece support 412 may include locating features to help main the proper orientation, e.g. orthogonal, of the workpiece support plane 414 and templates support plane 410. While illustrated as having the sacrificial support piece 415 located between side plates 425, 427, other configurations could have the side places 425, 427 provide part of void 413 such that longer sacrificial support pieces could be mounted to the template holding jig 402, e.g. longer than the width of the template holding jig 402.

Further, a mechanism, illustrated in the form of screws 429 (FIG. 22), can be used to selectively secure the sacrificial support piece 415 relative to the template support 408 and the workpiece support 410. Preferably, the size and shape of the sacrificial support piece 415 is such that the two outer surfaces 431, 433 perfectly align with and would otherwise form part of the template support plane 410 and workpiece support plane 414. The sacrificial support piece 415 can be formed from, preferably, any material that properly supports the workpiece 406 from tear outs but that does not, preferably, damage the router bit. Further, the user himself could easily prepare replacement sacrificial support pieces 415 from scrap pieces of material.

Further, when the user is forming a cut that does not extend entirely through the thickness of the workpiece 406, a non-sacrificial support member 435 can be located in void 413. This non-sacrificial support member 435 can be secured using screws 429. Further, just like the sacrificial support piece 415, the size and shape of the non-sacrificial support piece 435 is such that the non-sacrificial support piece 435 fills void 413 and the two outer surfaces 437, 439 perfectly align with and would otherwise form part of the template support plane 410 and workpiece support plane 414. This non-sacrificial support piece 435 could be option in that there is no need to support the backside of the workpiece 406 in this instance to prevent tear out as the router bit will not penetrate that surface of the workpiece (e.g. the surface that rests against the workpiece support 412).

Again, this option of providing a way to support a sacrificial support piece is fully compatible with all options outlined above.

Figure 25:
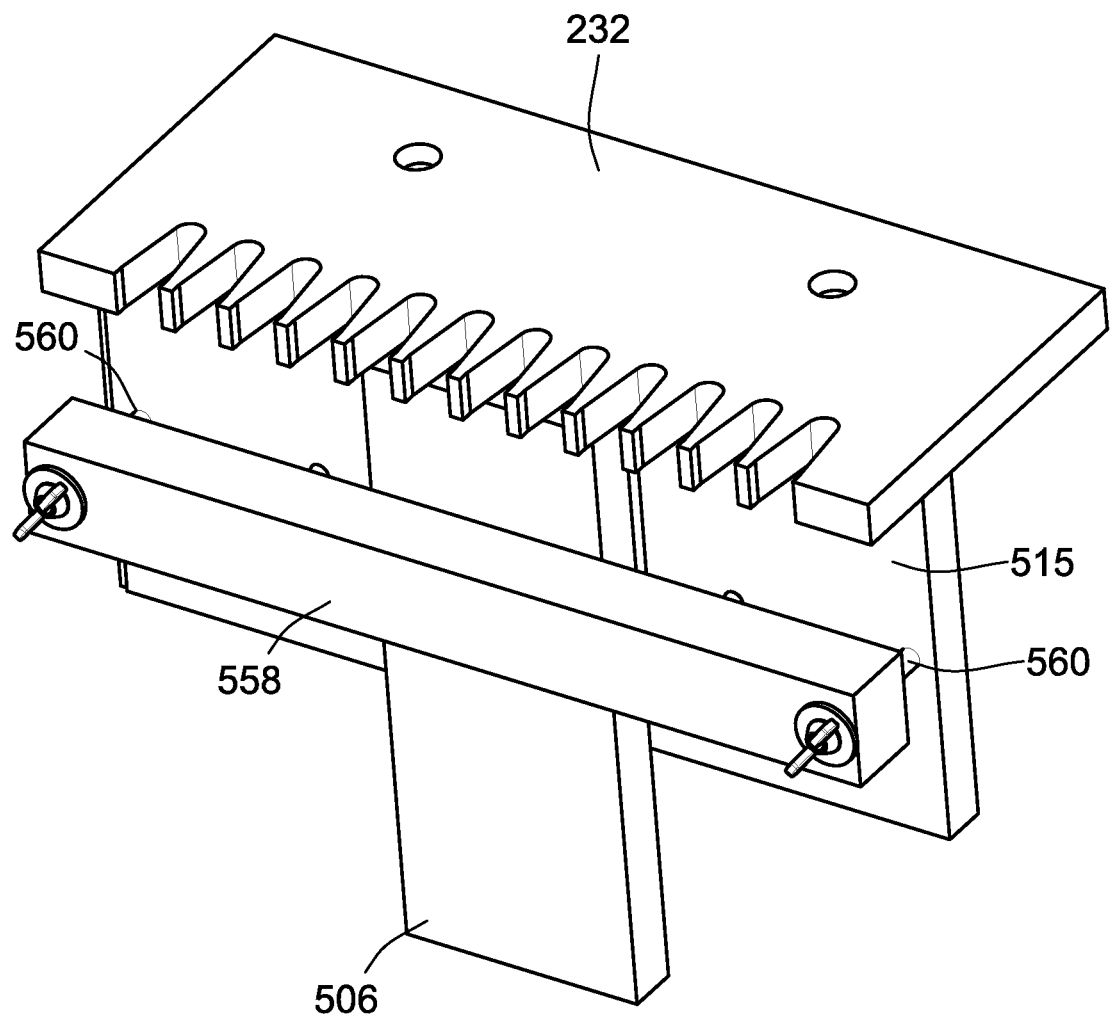
FIGS. 25-27 illustrate an alternative configuration of providing a sacrificial support piece that uses the workpiece joining jig of FIG. 1.
Figure 26:
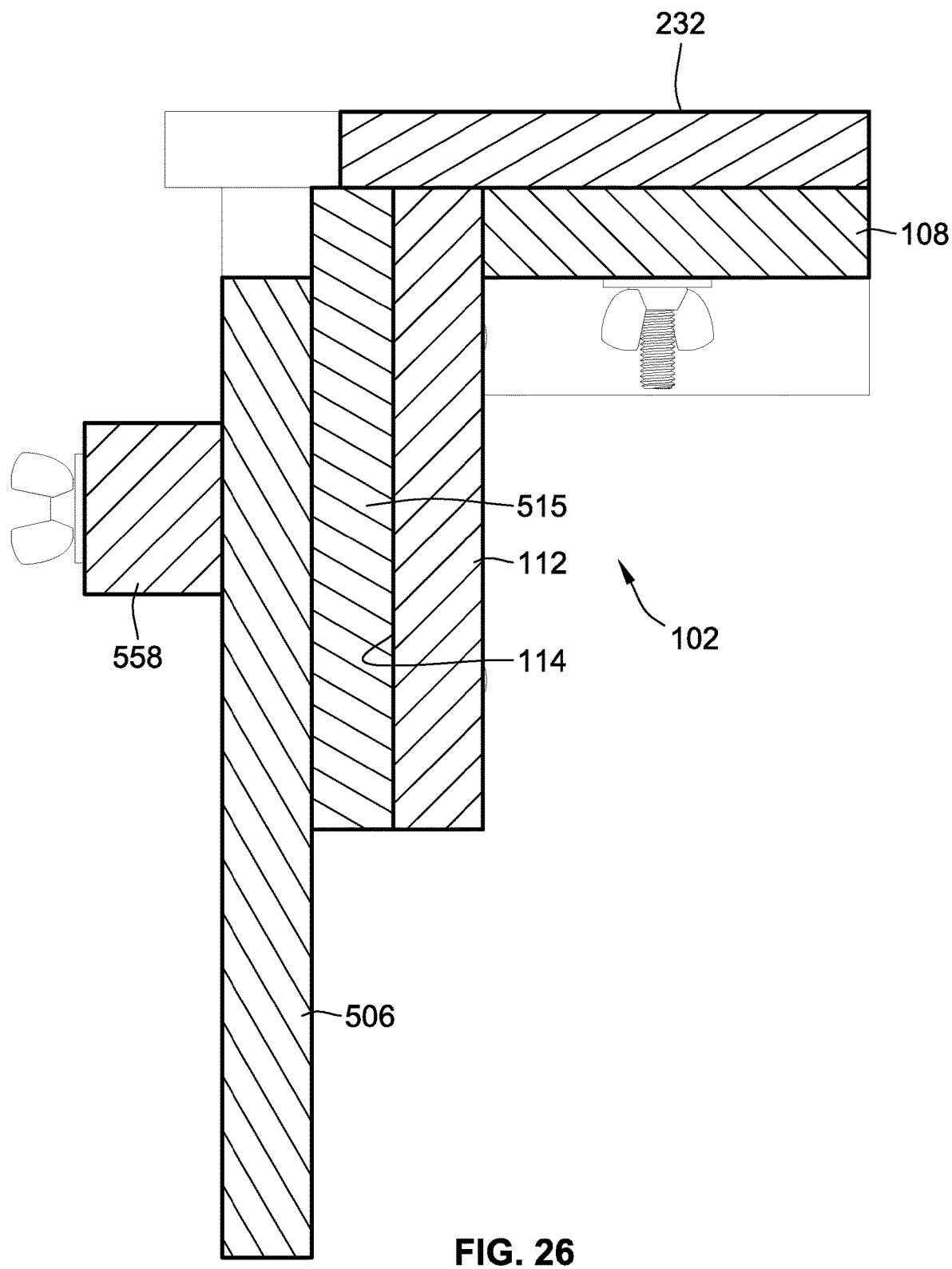
Figure 27:
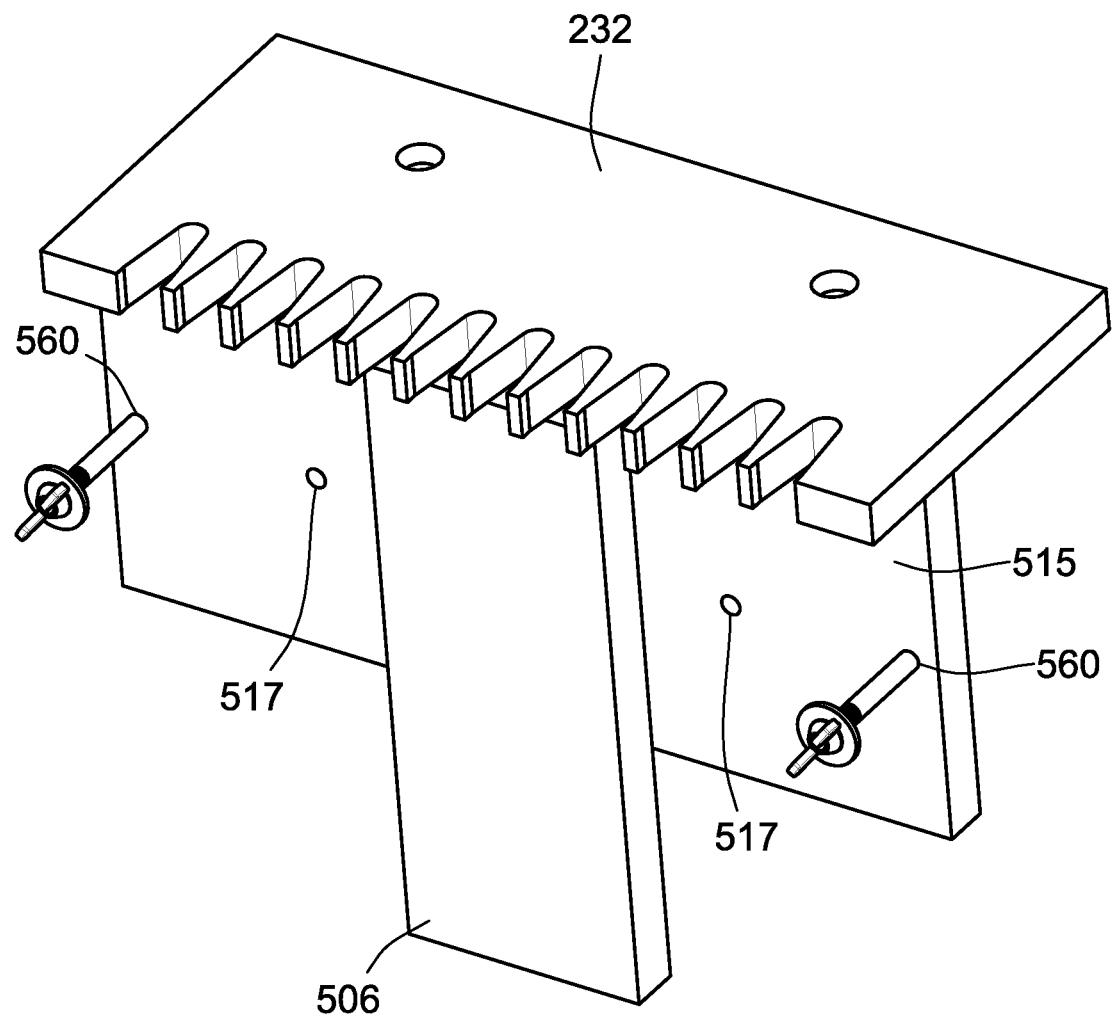

An alternative option for providing a sacrificial support piece is provided by the configuration illustrated in FIGS. 25-27. This configuration can be used with either templates support jig 102 or 402. It will be described with reference to template support jig 102.

In this configuration, the sacrificial support piece 515 is directly attached to and against the workpiece support plane 114 defined by the workpiece support 112 (see e.g. FIG. 26). This can be done using bolts 150, 151 (see e.g. FIG. 2) that pass through holes 517 (see FIG. 26) that pass through the sacrificial support piece 515 and corresponding holes 152, 153 formed in the workpiece support 112.

However, in this embodiment, the sacrificial support piece 515 prevents use of clamp 158 and side pieces 146, 148 (see e.g. FIG. 2). As such, this configuration includes a clamp member 558 that is operably connected to the sacrificial support pieces 515 for securing the workpiece 506 to the template support jig 102. In this embodiment, bolts 560 selectively secure the workpiece 506 to the sacrificial support piece 515. In this instance, the surface against which the workpiece 506 rests of the sacrificial support piece 515 could be considered to define a workpiece support plane.

While FIGS. 22-27 only relate to the use of template 232, other templates, such as template 230 could likewise be used, particularly for forming dovetail type joints where the router bit must pass entirely through the thickness of the workpiece.

Embodiments may be provided where only the template holding jig is provided. Alternatively, kits can be provided that include, for example, the template holding jig and a plurality of templates. Alternatively kits could be provided that include the template holding jig and the miter fence. Further kits could include all of the various components discussed herein.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A template holding jig for holding a template for use with a router for routing a workpiece, the template holding jig comprising:
    a template support defining a template support plane;
    a workpiece support defining a workpiece support plane extending perpendicular to the template support plane; and
    a template guide defining at least one abutment preventing motion of a template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane, the at least one abutment being elongated parallel to the second axis such that the at least one abutment includes at least a first template abutment surface portion and a second template abutment surface portion spaced axially relative to one another parallel to the second axis, the first and second template abutment surface portions being spaced a same distance from the second axis parallel to the first axis, the template being movable relative to the at least one abutment when the template is abutting the first and second template abutment surface portions; and
    a template attachment for affixing the template to the template support, the template attachment having:
        a first configuration securing the template to the template support such that the template is affixed to and cannot be moved relative to the template support; and
        a second configuration that allows the template to be moved relative to the template support parallel to the second axis, in the second configuration, the template attachment prevents the template from being removed from the template support.

2. The template holding jig of claim 1, wherein the at least one abutment of the template guide is provided by first and second walls that are parallel to one another and spaced apart from one another parallel to the first axis, the first and second walls being offset from the template support plane parallel to a third axis being parallel to the workpiece support plane and perpendicular to the first and second axes, the first wall providing the first and second template abutment surface portions, the second wall providing third and fourth template abutment surface portions that are axially spaced relative to one another parallel to the second axis, the third and fourth template abutment surface portions being spaced a same distance from the second axis parallel to the first axis.

3. The template holding jig of claim 2, wherein the first and second walls are positioned at opposite first and second ends of the template support with the template support being positioned between the first and second walls.

4. A template holding jig for holding a template for use with a router for routing a workpiece, the template holding jig comprising:
    a template support defining a template support plane;
    a workpiece support defining a workpiece support plane extending perpendicular to the template support plane;
    a template guide defining at least one abutment preventing motion of a template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane, the at least one abutment being elongated parallel to the second axis such that the at least one abutment includes at least a first template abutment surface portion and a second template abutment surface portion spaced axially relative to one another parallel to the second axis, the first and second template abutment surface portions being spaced a same distance from the second axis parallel to the first axis, the template being movable relative to the at least one abutment when the template is abutting the first and second template abutment surface portions;
    a template attachment for affixing the template to the template support, the template attachment having a first configuration securing the template to the template support such that the template is affixed to and cannot be moved relative to the template support and a second configuration that allows the template to be moved relative to the template support parallel to the second axis; and
    wherein the template attachment is a bolt extending parallel to a third axis being orthogonal to the template support plane and a releasable nut, the nut and template support sandwiching the template therebetween when the template attachment is in the first configuration.

5. The template holding jig of claim 1, wherein a portion of the template support that defines the template support plane is an exterior surface of the template support and a portion of the workpiece support that defines the workpiece support plane is an exterior surface of the work piece support, the exterior surface of the template support does not extend beyond the exterior surface of the workpiece support, the template support plane and the workpiece support plane having an exterior angle of 270 degrees therebetween.

6. A template holding jig for holding a template for use with a router for routing a workpiece, the template holding jig comprising:
    a template support defining a template support plane;
    a workpiece support defining a workpiece support plane extending perpendicular to the template support plane; and
    a template guide defining an at least one abutment preventing motion of a template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane, the at least one abutment being elongated parallel to the second axis such that the at least one abutment includes at least a first template abutment surface portion and a second template abutment surface portion spaced axially relative to one another parallel to the second axis, the first and second template abutment surface portions being spaced a same distance from the second axis parallel to the first axis, the template being movable relative to the at least one abutment when the template is abutting the first and second template abutment surface portions; and further comprising first and second workpiece side stops mounted adjacent the workpiece support, the first and second workpiece side stops being adjustably positionable parallel to the first axis relative to the workpiece support to adjust a spacing between the first and second workpiece side stops.

7. The template holding jig of claim 6, further comprising first and second workpiece side stop mounts, the first workpiece side stop mount selectively fixing the position of the first workpiece side stop relative to the workpiece support and the second workpiece side stop mount selectively fixing the position of the second workpiece side stop relative to the workpiece support; and wherein:
the first workpiece side stop has a front face that faces away from the workpiece support and a rear face that abuts the workpiece support; and
the first workpiece side stop mount includes a first nut that presses against the front face of the first workpiece side stop with the first workpiece side stop located between the first nut and the workpiece support such that the first workpiece side mount can be released by manipulating the first nut at a location forward of the workpiece support;
the second workpiece side stop has a front face that faces away from the workpiece support and a rear face that abuts the workpiece support; and
the second workpiece side stop mount includes a second nut that presses against the front face of the second workpiece side stop with the second workpiece side stop located between the second nut and the workpiece support such that the second workpiece side mount can be released by manipulating the second nut at a location forward of the workpiece support.

8. The template holding jig of claim 6, further comprising a clamp attached to the first workpiece side stop, the clamp movable with the first workpiece side stop relative to the workpiece support, the clamp being actuatable to provide a force orthogonal to the workpiece support plane to a workpiece being supported by the workpiece support positioned adjacent the first workpiece side stop.

9. The template holding jig of claim 1, further comprising a miter fence defining a first miter abutment plane that extends orthogonally relative to the workpiece support plane and at a 45 degree angle to the template support plane and a second miter abutment plane that extends orthogonal to the first miter abutment plane and orthogonally relative to the workpiece support plane and at a 45 degree angle to the template support plane, the miter fence being fixably attachable adjacent to the workpiece support.

10. A template holding jig for holding a template for use with a router for routing a workpiece, the template holding jig comprising:
a template support defining a template support plane;
a workpiece support defining a workpiece support plane extending perpendicular to the template support plane; and
a template guide defining at least one abutment preventing motion of a template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane;
a template attachment for affixing the template to the template support;
a miter fence defining a first miter abutment plane that extends orthogonally relative to the workpiece support plane and at a 45 degree angle to the template support plane and a second miter abutment plane that extends orthogonal to the first miter abutment plane and orthogonally relative to the workpiece support plane and at a 45 degree angle to the template support plane, the miter fence being fixably attachable adjacent to the workpiece support; and
wherein a position of the template support is adjustably fixable relative to the miter fence parallel to a third axis being parallel to the workpiece support plane and perpendicular to the first and second axes.

11. The template holding jig of claim 9, further comprising first and second workpiece support guides attached to the miter fence, the first and second workpiece support guides being spaced apart parallel to the first axis forming a gap therebetween, the workpiece support being positioned between and in abutment with the first and second workpiece support guides.

12. The template holding jig of claim 11, wherein the first and second workpiece support guides and miter fence form a support base that is releasably attachable to the workpiece support and template support.

13. A template holding jig for holding a template for use with a router for routing a workpiece, the template holding jig comprising:
a template support defining a template support plane;
a workpiece support defining a workpiece support plane extending perpendicular to the template support plane; and
a template guide defining at least one abutment preventing motion of a template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane, the at least one abutment being elongated parallel to the second axis such that the at least one abutment includes at least a first template abutment surface portion and a second template abutment surface portion spaced axially relative to one another parallel to the second axis, the first and second template abutment surface portions being spaced a same distance from the second axis parallel to the first axis, the template being movable relative to the at least one abutment when the template is abutting the first and second template abutment surface portions;
a miter fence defining a first miter abutment plane that extends orthogonally relative to the workpiece support plane and at a 45 degree angle to the template support plane and a second miter abutment plane that extends orthogonal to the first miter abutment plane and orthogonally relative to the workpiece support plane and at a 45 degree angle to the template support plane, the miter fence being fixably attachable adjacent to the workpiece support;
first and second clamps attached to the miter fence, the first clamp actuatable to provide a force orthogonal to the workpiece support plane between the template support plane and the first miter abutment plane, the second clamp actuatable to provide a force orthogonal to the workpiece support plane between the template support plane and the second miter abutment plane; and wherein a position of the miter fence is adjustably fixable relative to the template support and the workpiece support parallel to a third axis being parallel to the workpiece support plane and perpendicular to the first and second axes, the clamps being movable with the miter fence parallel to the third axis to adjust a position of the clamps relative to the workpiece support.

14. The template holding jig of claim 9, wherein:

the at least one abutment of the template guide is provided by first and second walls that are parallel to one another and spaced apart from one another along the first axis; and the first and second miter abutment planes intersect at an intersection, the intersection being centered between the first and second walls along the first axis.

15. A workpiece joining jig for use with a router for joining workpieces comprising:

the template holding jig according to claim 1; and a first template removably mountable to the template support in abutment with the template guide, the first template being fixed to the template guide and template support when the first template is mounted to the template support and the template attachment is in the first configuration.

16. The workpiece joining jig of claim 15, wherein the first template is movable relative to the template guide and template support when the first template is mounted to the template support and the template attachment is in the second configuration.

17. The workpiece joining jig of claim 15, wherein the first template has a first router guide region configured to guide motion of a router relative to the first template in a first predetermined manner such that the router may engage the workpiece mounted to the workpiece support; and further comprising a second template removably mountable to the template support in abutment with the template guide, the second template being fixed to the template guide and template support when the second template is mounted to the template support and the template attachment is in the first configuration, the second template having a second router guide region configured to guide motion of the router relative to the second template in a second predetermined manner such that the router may engage the workpiece mounted to the workpiece support, the second predetermined manner being different than the first predetermined manner.

18. The workpiece joining jig of claim 17, wherein:

the first router guide region is at least one hole extending through a first body of the first template permitting axial motion of the router parallel to a central axis of the hole through the first body, the central axis of the at least one hole being perpendicular to the first and second axes and parallel to the workpiece support plane, the at least one hole preventing motion of the router parallel to the template support plane when engaged with the router, and the second router guide region is an elongated slot formed in and extending through a second body of the second template permitting axial motion of the router parallel to the second axis and parallel to the template support plane and orthogonal to the workpiece support plane, the elongated slot preventing motion of the router parallel to the first axis when engaged with the router.

19. A workpiece joining jig for use with a router for joining workpieces comprising:

the template holding jig comprising:

a template support defining a template support plane;

a workpiece support defining a workpiece support plane extending perpendicular to the template support plane; and a template guide defining at least one abutment preventing motion of a template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane; and a template attachment for affixing the template to the template support;

a first template removably mountable to the template support in abutment with the template guide, the first template being fixed to the template guide and template support when the first template is mounted to the template support and the template attachment is in the first configuration, the first template having a first router guide region configured to guide motion of a router relative to the first template in a first predetermined manner such that the router may engage the workpiece mounted to the workpiece support;

a second template removably mountable to the template support in abutment with the template guide, the second template being fixed to the template guide and template support when the second template is mounted to the template support and the template attachment is in the first configuration, the second template having a second router guide region configured to guide motion of the router relative to the second template in a second predetermined manner such that the router may engage the workpiece mounted to the workpiece support, the second predetermined manner being different than the first predetermined manner;

wherein:

the at least one abutment of the template guide is provided by first and second walls that are parallel to one another and spaced apart from one another parallel to the first axis, the first and second walls being offset from the template support plane parallel to a third axis being parallel to the workpiece support plane and perpendicular to the first and second axes;

the first template including first and second spaced apart abutments configured to abut the first and second walls to prevent movement of the first template parallel to the first axis when the first template is mounted to the template support, the first and second abutments permitting movement of the first template parallel to the second axis when the template attachment is in the second configuration; and the second template including third and fourth spaced apart abutments configured to abut the first and second walls to prevent movement of the second template parallel to the first axis when the second template is mounted to the template support, the third and fourth abutments permitting movement of the second template parallel to the second axis when the template attachment is in the second configuration.

20. The workpiece joining jig of claim 15, wherein:
the at least one abutment of the template guide is provided by first and second walls that are parallel to one another and spaced apart from one another parallel to the first axis, the first and second walls being offset from the template support plane parallel to a third axis being parallel to the workpiece support plane and perpendicular to the first and second axes;
the first template including first and second spaced apart abutments configured to abut the first and second walls to prevent movement of the first template parallel to the first axis when the first template is mounted to the template support, the first and second abutments permitting movement of the first template parallel to the second axis when the template attachment is in the second configuration.

21. The workpiece joining jig of claim 20, wherein the first and second walls face each other along the first axis and the first and second spaced apart abutments face away from one another along the first axis.

22. The workpiece joining jig of claim 15, further comprising a miter fence defining a first miter abutment plane that extends orthogonally relative to the workpiece support plane and at a 45 degree angle to the template support plane and a second miter abutment plane that extends orthogonal to the first miter abutment plane and orthogonally relative to the workpiece support plane and at a 45 degree angle to the template support plane.

23. The workpiece joining jig of claim 22, wherein the miter fence is releasably attachable adjacent to the workpiece support.

24. A template holding jig for holding a template for use with a router for routing a workpiece, the template holding jig comprising:
a template support defining a template support plane;
a workpiece support defining a workpiece support plane extending perpendicular to the template support plane; and
a template guide defining at least one abutment preventing motion of a template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane;
a template attachment for affixing the template to the template support; and
wherein the template support is positioned away from the workpiece support plane in a direction parallel to the second axis, and the workpiece support is positioned offset from the template support plane along a third axis that is parallel to the workpiece support plane and that is perpendicular to the first and second axes such that a void is formed by the template support and the workpiece support proximate the intersection of the template support plane and the workpiece support plane, the void being offset along the third axis from the workpiece support such that the void is positioned between the workpiece support and the template support plane and offset in the direction parallel to the second axis such that the void is positioned between the workpiece support plane and the template support.

25. The template holding jig of claim 24, further comprising a sacrificial support piece located within the void.

26. The template holding jig of claim 25, wherein one side of the sacrificial support piece forms part of the workpiece support plane and supports a workpiece when mounted to the workpiece support plane, wherein the sacrificial support piece and the workpiece support both define part of the workpiece support plane.

27. The template holding jig of claim 25, wherein the sacrificial support piece is replaceable.

28. The template holding jig of claim 1, further comprising a sacrificial support piece mounted to the workpiece support against the workpiece support plane, the sacrificial support piece defining a second workpiece support plane offset from and parallel to the workpiece support plane defined by the workpiece support; and
wherein the sacrificial support piece has a length that is longer than the width of the workpiece support that is parallel to the first axis.

29. The template holding jig of claim 1, further comprising:
a sacrificial support piece mounted to the workpiece support against the workpiece support plane, the sacrificial support piece defining a second workpiece support plane offset from and parallel to the workpiece support plane defined by the workpiece support; and
a clamp for securing the workpiece against the second workpiece support plane, the clamp being directly mounted on the sacrificial support piece.

30. The template holding jig of claim 1, wherein the first and second template abutment surface portions form part of a planar surface that is elongated parallel to the second axis.

31. The template holing jig of claim 1, wherein the first and second template abutment surface portions define an abutment plane that is parallel to the second axis and orthogonal to the workpiece support plane.

32. A template holding jig for holding a template for use with a router for routing a workpiece, the template holding jig comprising:
a template support defining a template support plane;
a workpiece support defining a workpiece support plane extending perpendicular to the template support plane; and
a template guide defining at least one abutment preventing motion of the template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane; and
a template attachment for affixing the template to the template support, the template attachment being spaced laterally away from the template guide along the first axis forming a gap therebetween, the template attachment having:
a first configuration securing the template to the template support such that the template is affixed to and cannot be moved relative to the template support; and
a second configuration that allows the template to be moved relative to the template support parallel to the second axis, in the second configuration, the template attachment prevents the template from being removed from the template support.

33. The template holding jig of claim 32, further comprising:
a clamp adjustably mounted relative to the workpiece support, the clamp being selectively positionable parallel to the first axis relative to the work piece support, the clamp being actuatable to provide a force orthogonal to the workpiece support plane to a workpiece being supported by the workpiece support.

34. A template holding jig for holding a template for use with a router for routing a workpiece, the template holding jig comprising:
   a template support defining a template support plane;
   a workpiece support defining a workpiece support plane extending perpendicular to the template support plane; and
   a template guide defining at least one abutment preventing motion of the template located on the template support parallel to a first axis being parallel to the workpiece support plane and parallel to the template support plane but permitting motion of the template parallel to a second axis being orthogonal to the workpiece support plane and perpendicular to the first axis and parallel to the template support plane; and
   a template attachment for affixing the template to the template support,
   a clamp adjustably mounted relative to the workpiece support, the clamp being selectively positionable parallel to the first axis relative to the workpiece support, the clamp being actuatable to provide a force orthogonal to the workpiece support plane to a workpiece being supported by the workpiece support.

35. The template holding jig of claim 34, further comprising
   a workpiece side stop adjustably mounted adjacent the workpiece support for selectively positioning the workpiece side stop relative to the workpiece support parallel to the first axis, the clamp mounted to the workpiece side stop and moveable relative to the workpiece support with the workpiece side stop.

* * * * *